No. 751,971. PATENTED FEB. 9, 1904.
H. S. BAILEY & W. E. WILD.
ORE CONCENTRATOR.
APPLICATION FILED FEB. 14, 1901.
NO MODEL. 19 SHEETS—SHEET 2.
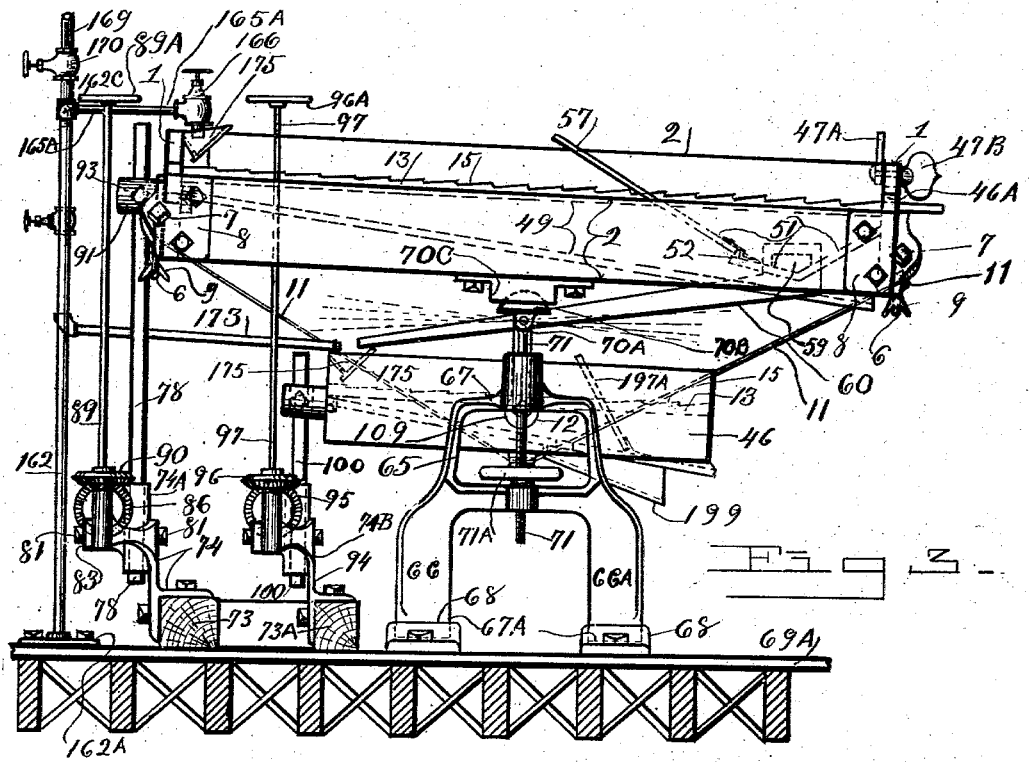
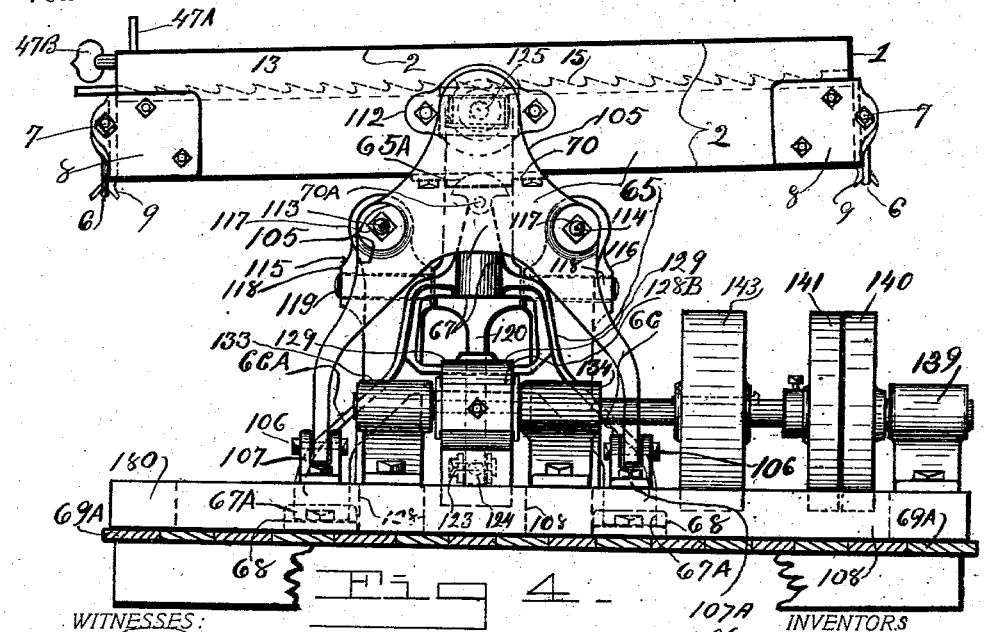
WITNESSES:
Bessie Thompson
Claude A. Dunn
INVENTORS
Howard S. Bailey
BY William E. Wild.
H. S. Bailey, ATTORNEY.

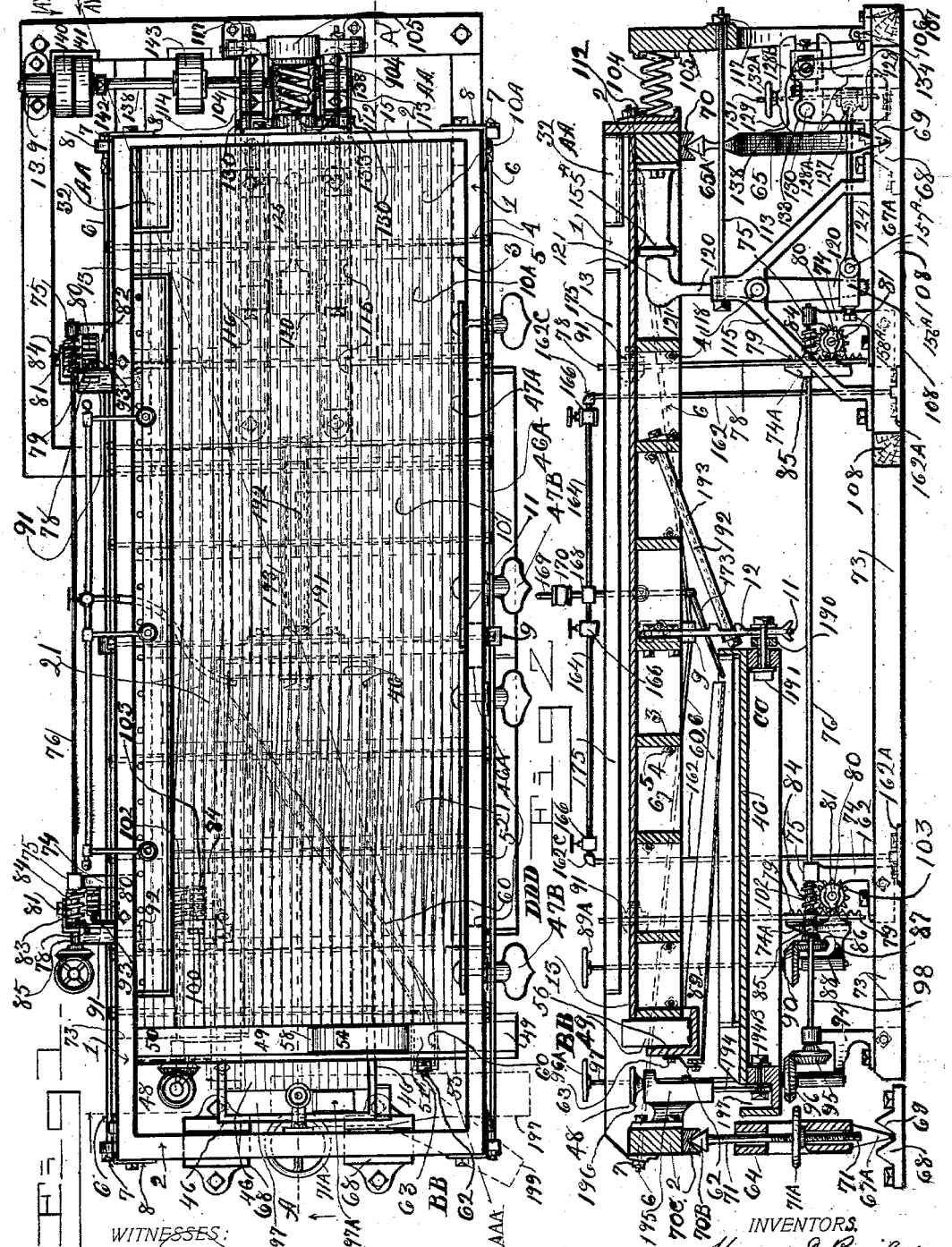

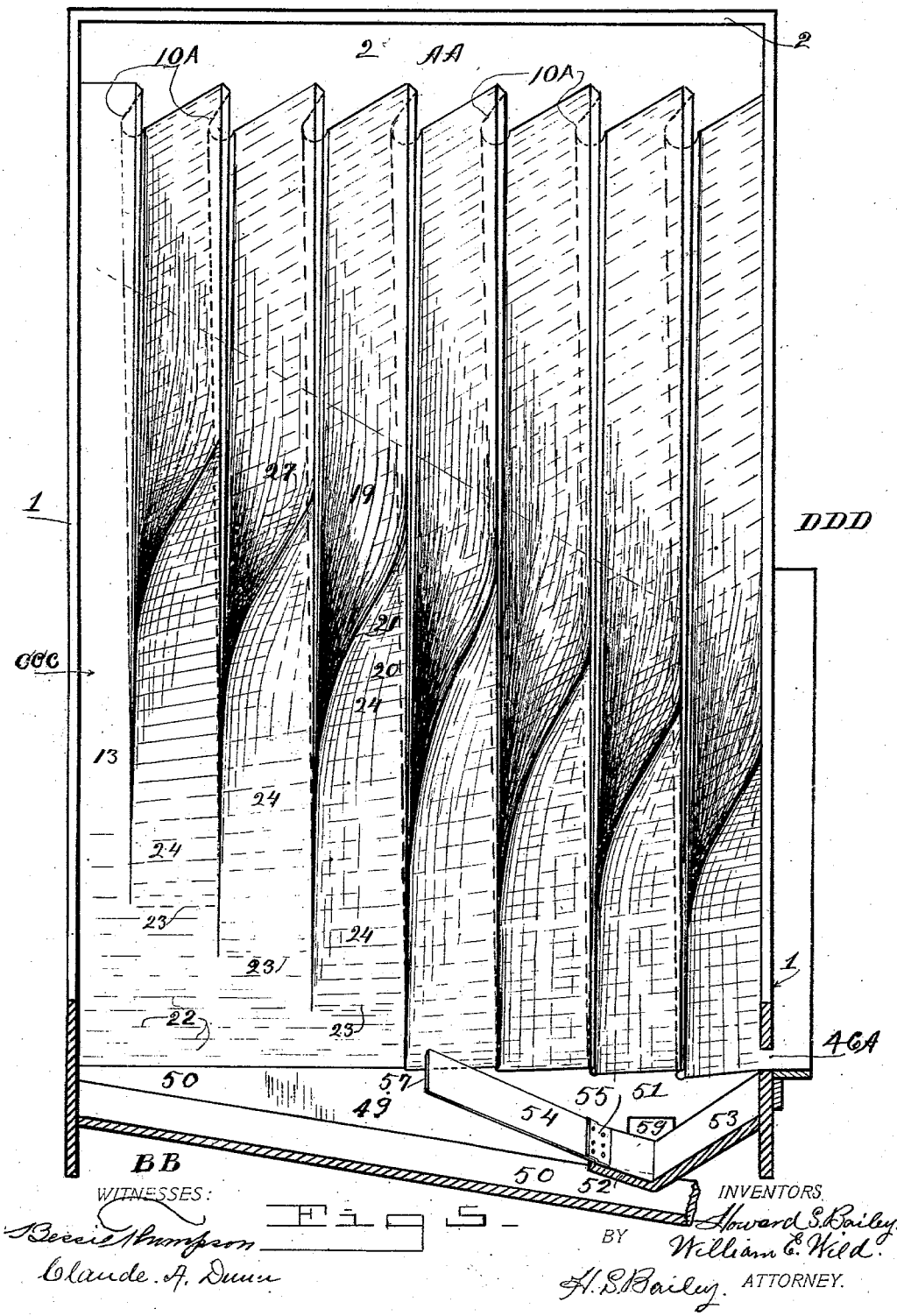

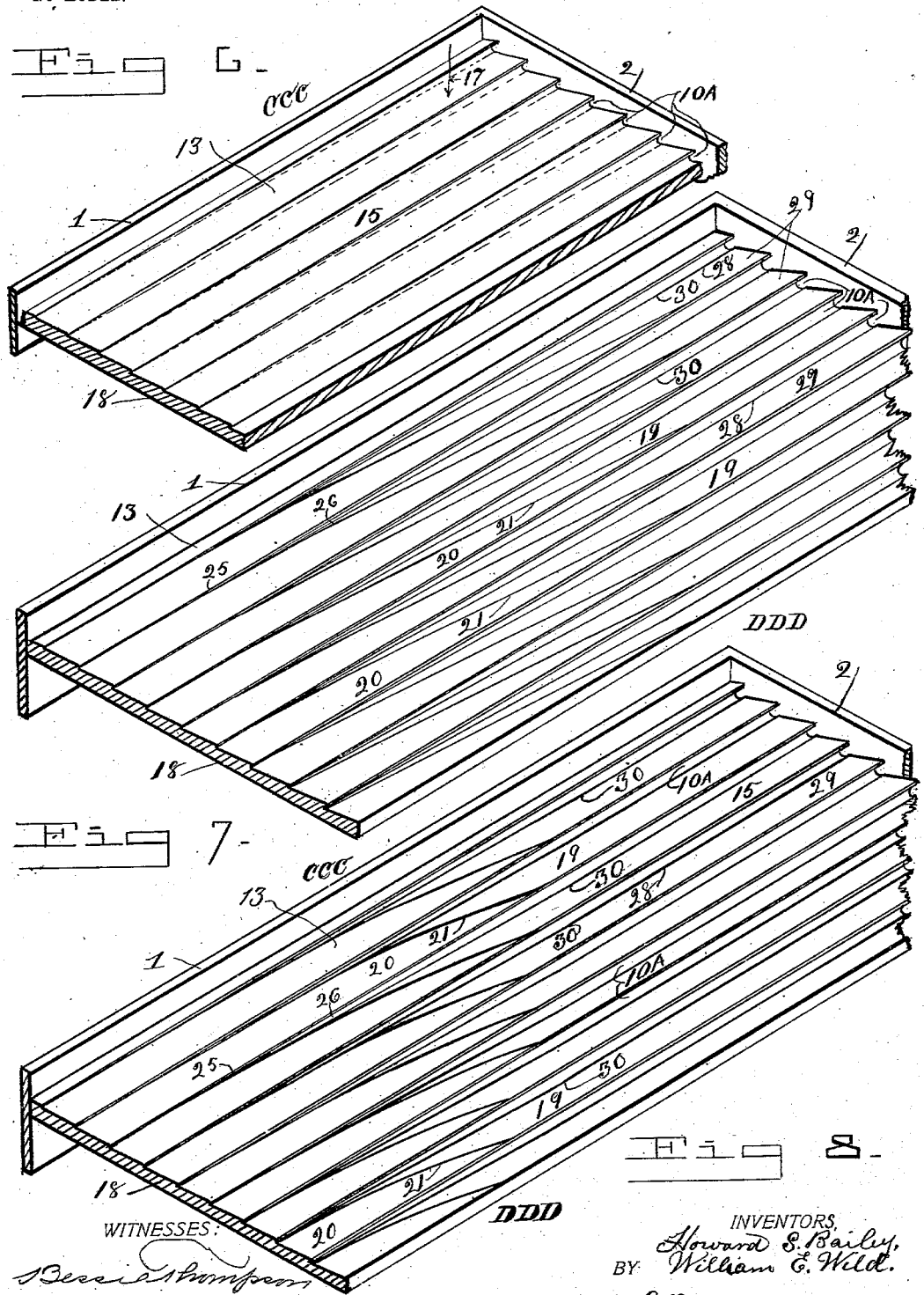

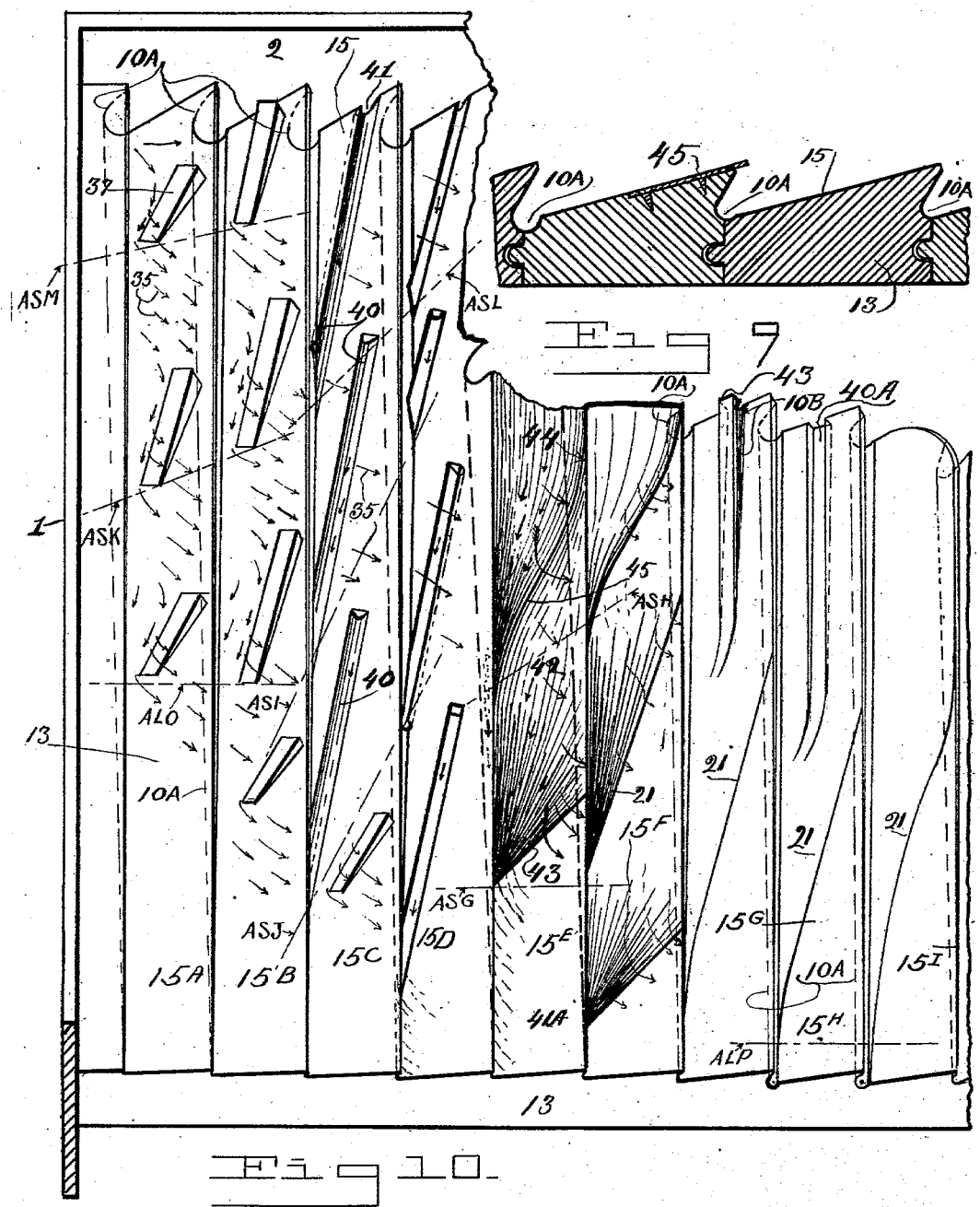

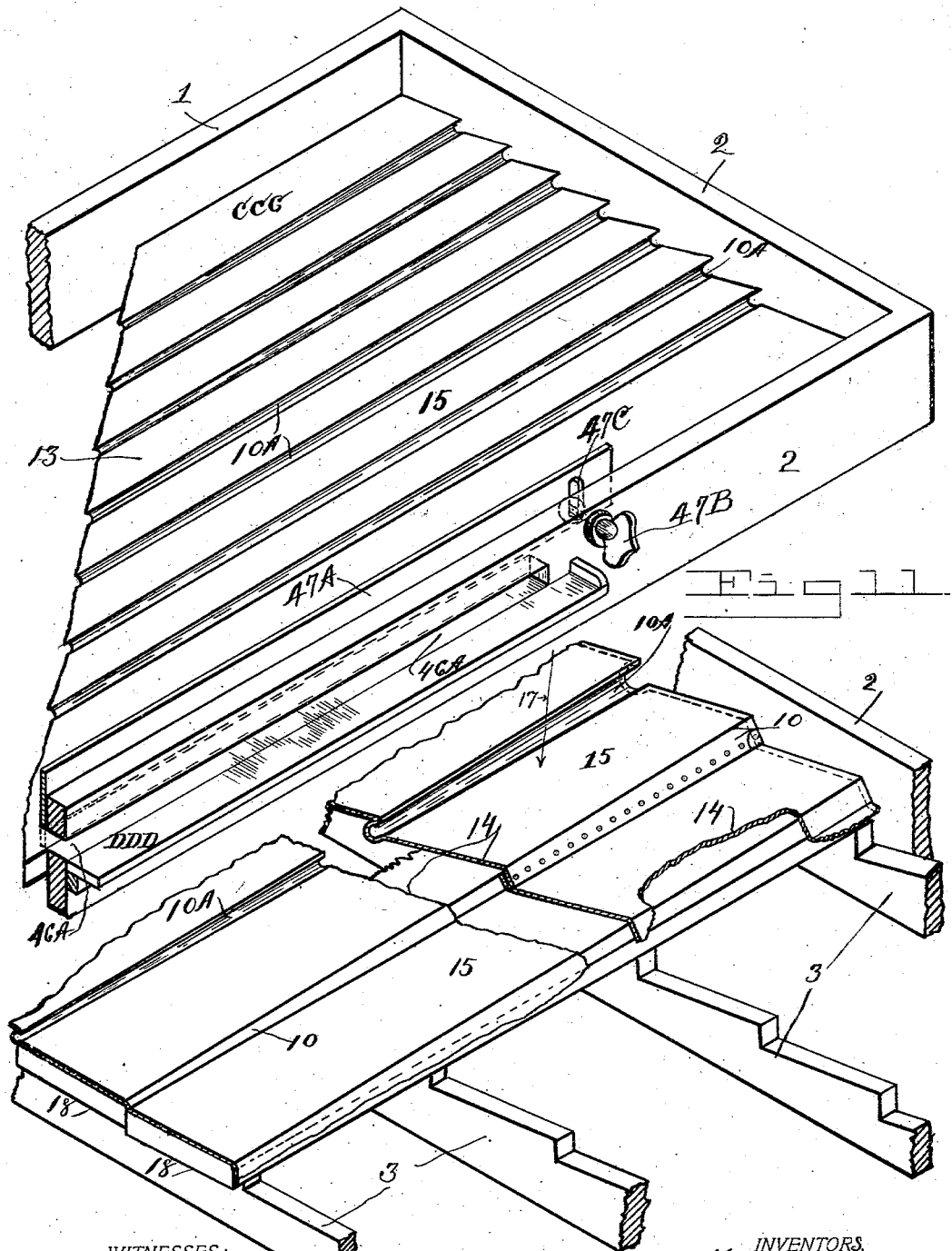

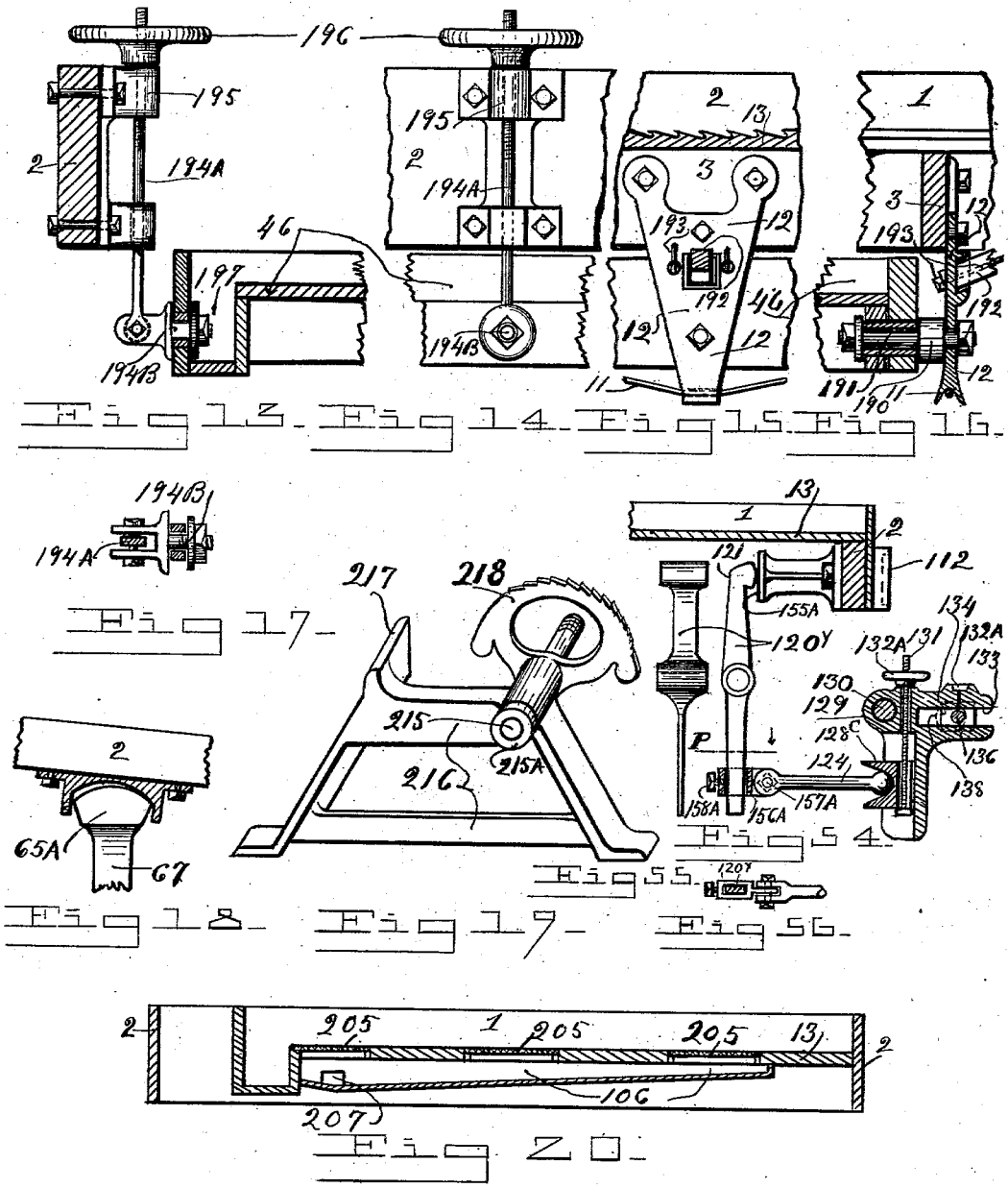

No. 751,971. PATENTED FEB. 9, 1904.
H. S. BAILEY & W. E. WILD.
ORE CONCENTRATOR.
APPLICATION FILED FEB. 14, 1901.
NO MODEL. 19 SHEETS—SHEET 8.
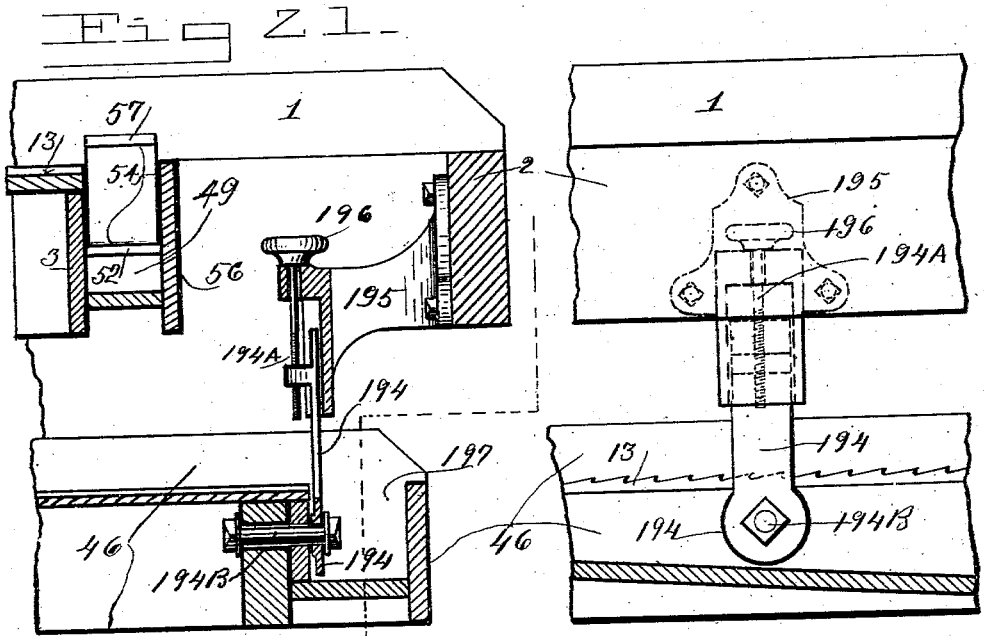
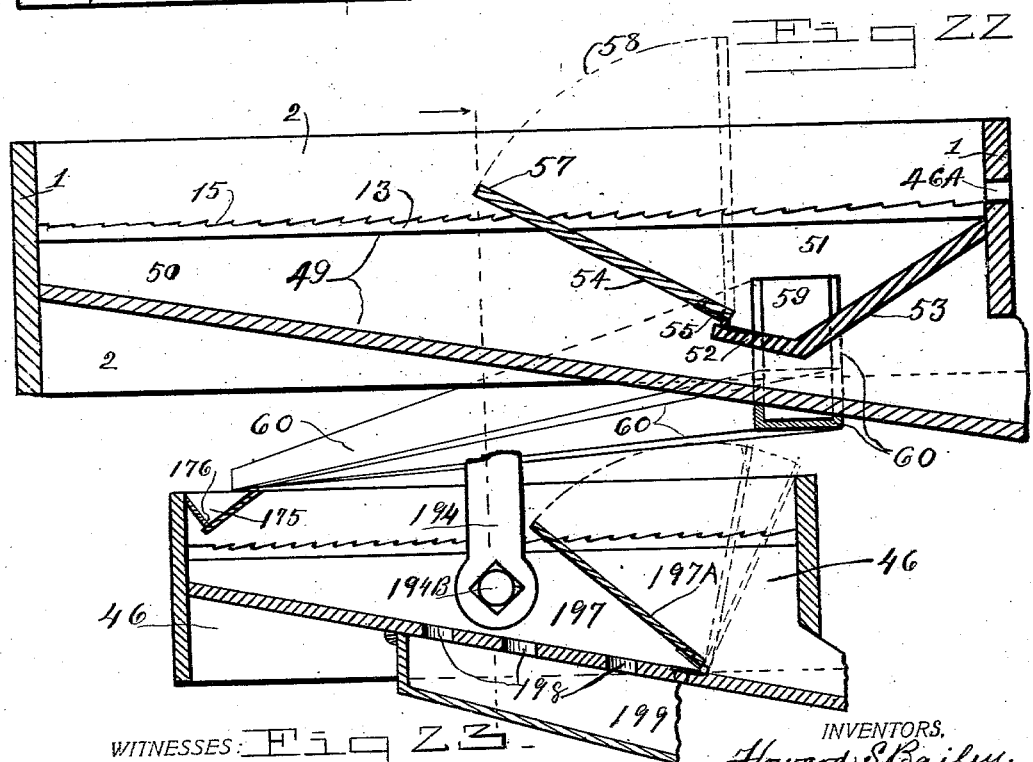
WITNESSES:
Bessie Thompson
Claude A. Dunn.
INVENTORS.
Howard S. Bailey.
BY William E. Wild.
H. S. Bailey. ATTORNEY.

No. 751,971. PATENTED FEB. 9, 1904.
H. S. BAILEY & W. E. WILD.
ORE CONCENTRATOR.
APPLICATION FILED FEB. 14, 1901.
NO MODEL. 19 SHEETS—SHEET 9.
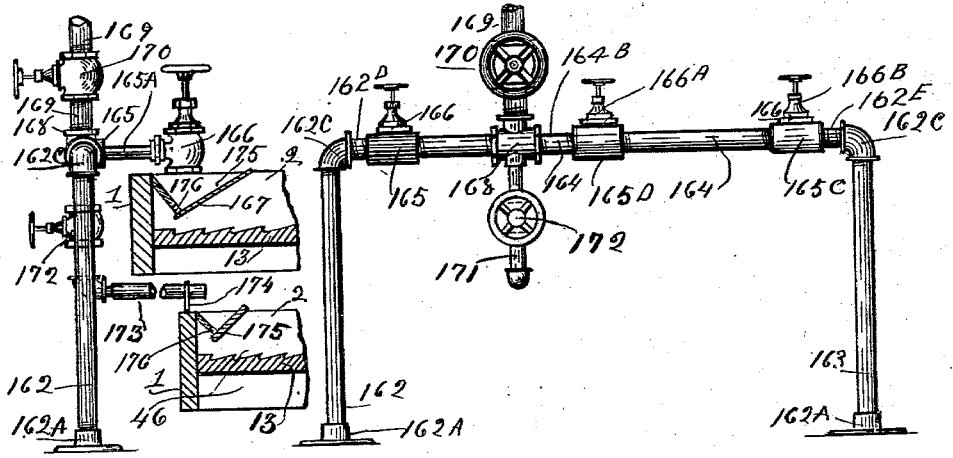
Fig. 24.  Fig. 25.
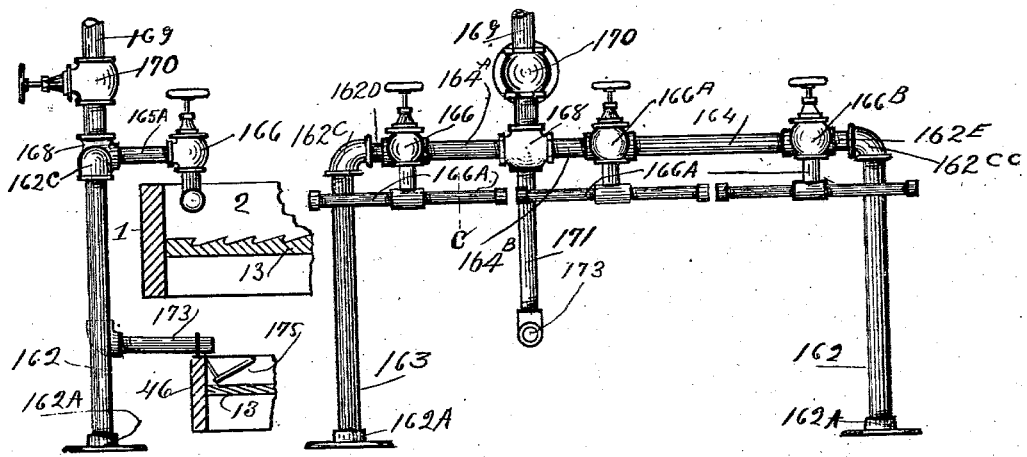
Fig. 26.  Fig. 27.
Fig. 28.
WITNESSES:
Bessie Thompson.
Claude A. Dunn.
INVENTORS
Howard S. Bailey.
BY William E. Wild.
H. S. Bailey. ATTORNEY.

No. 751,971. PATENTED FEB. 9, 1904.
H. S. BAILEY & W. E. WILD.
ORE CONCENTRATOR.
APPLICATION FILED FEB. 14, 1901.
NO MODEL. 19 SHEETS—SHEET 10.
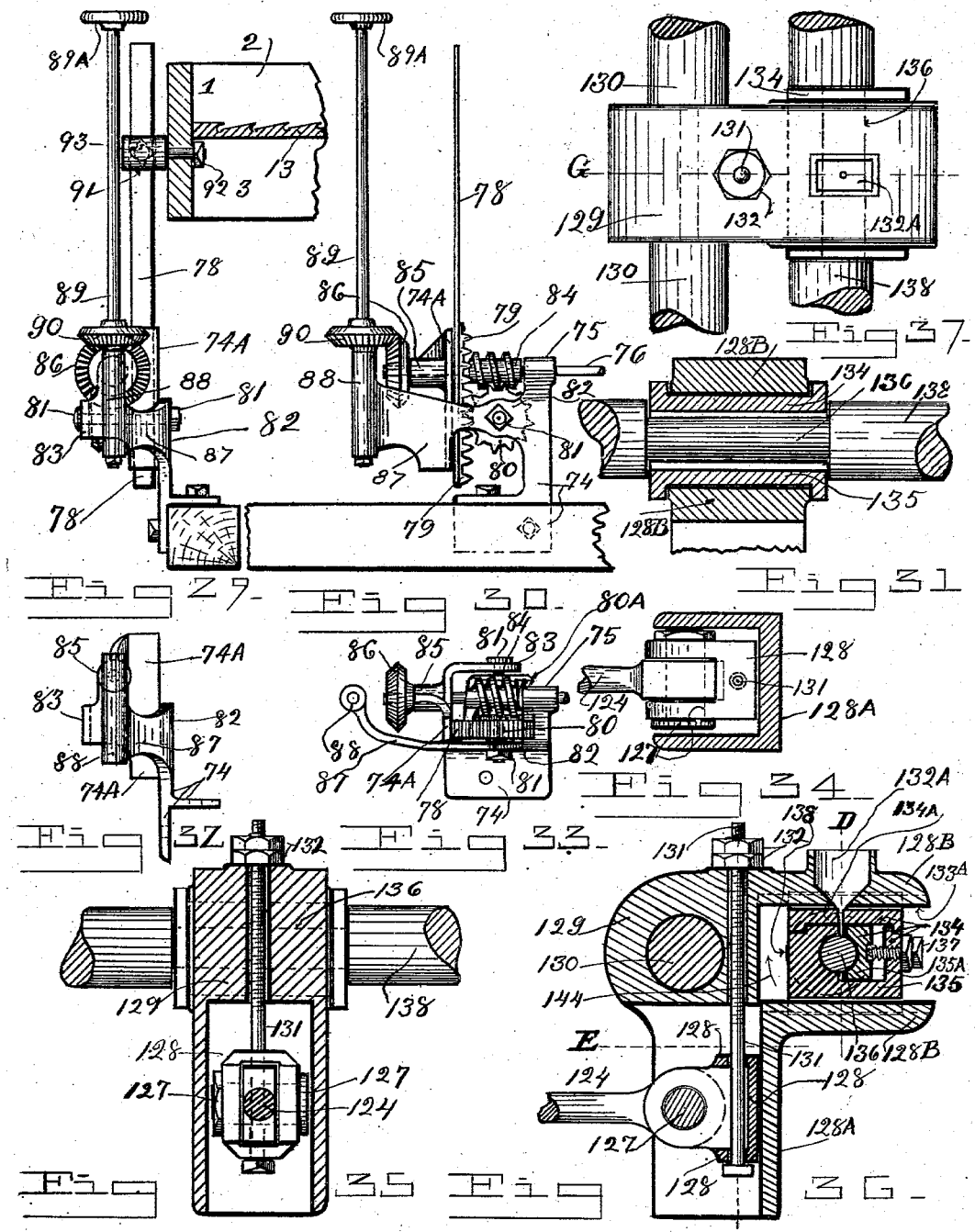
WITNESSES:
INVENTORS.
Howard S. Bailey,
BY William E. Wild.
H. S. Bailey.
ATTORNEY.

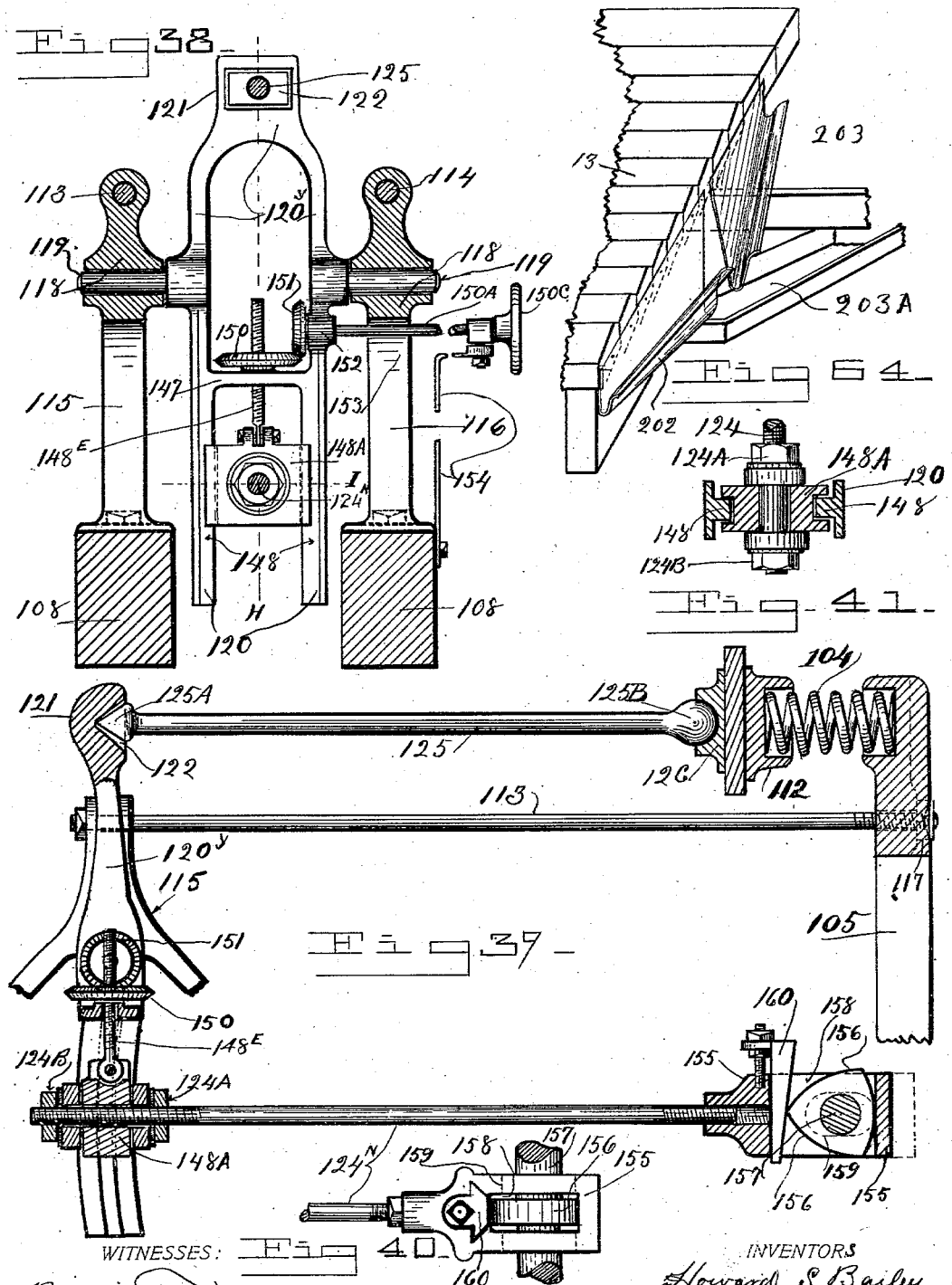

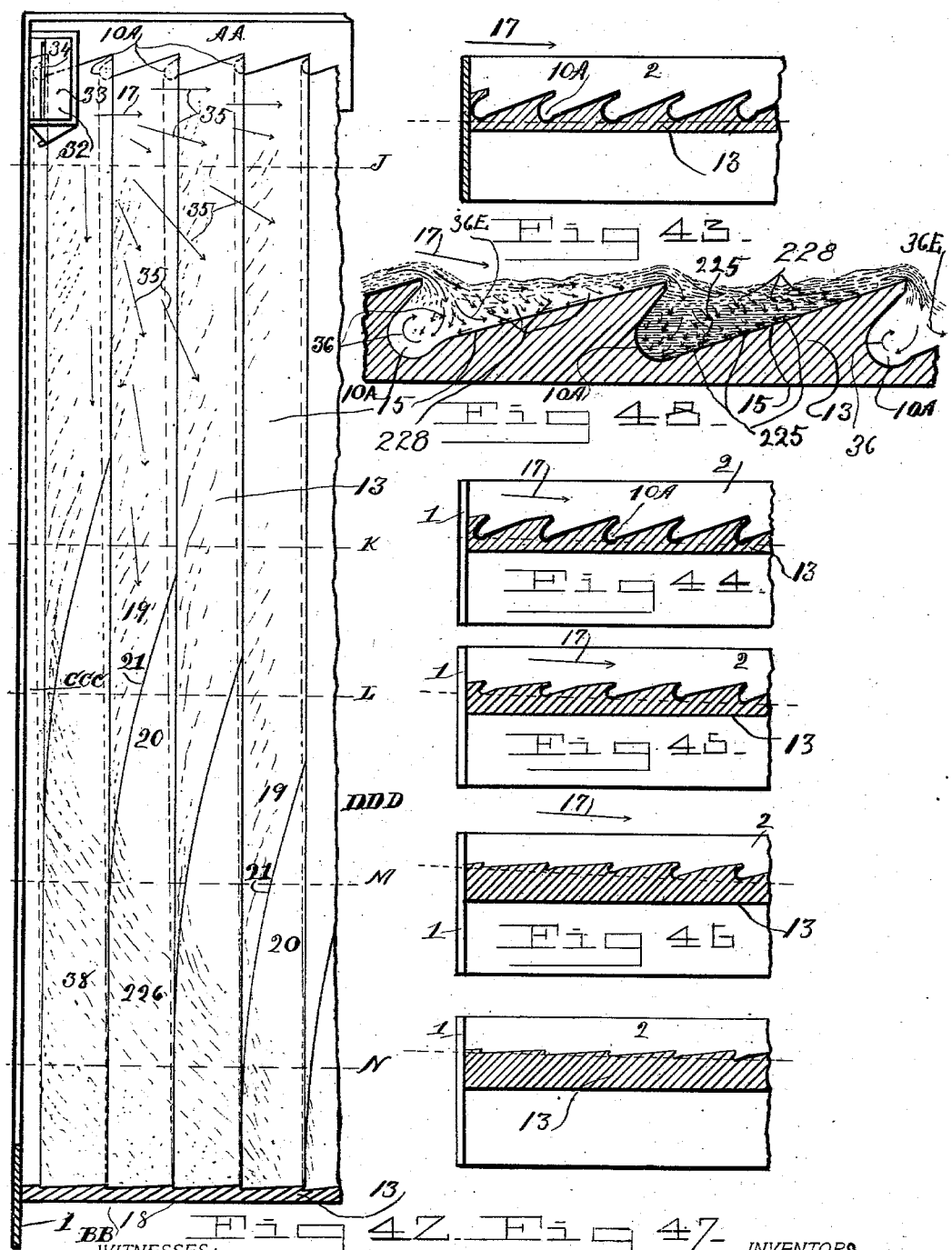

No. 751,971. PATENTED FEB. 9, 1904.
H. S. BAILEY & W. E. WILD.
ORE CONCENTRATOR.
APPLICATION FILED FEB. 14, 1901.
NO MODEL. 19 SHEETS—SHEET 13.
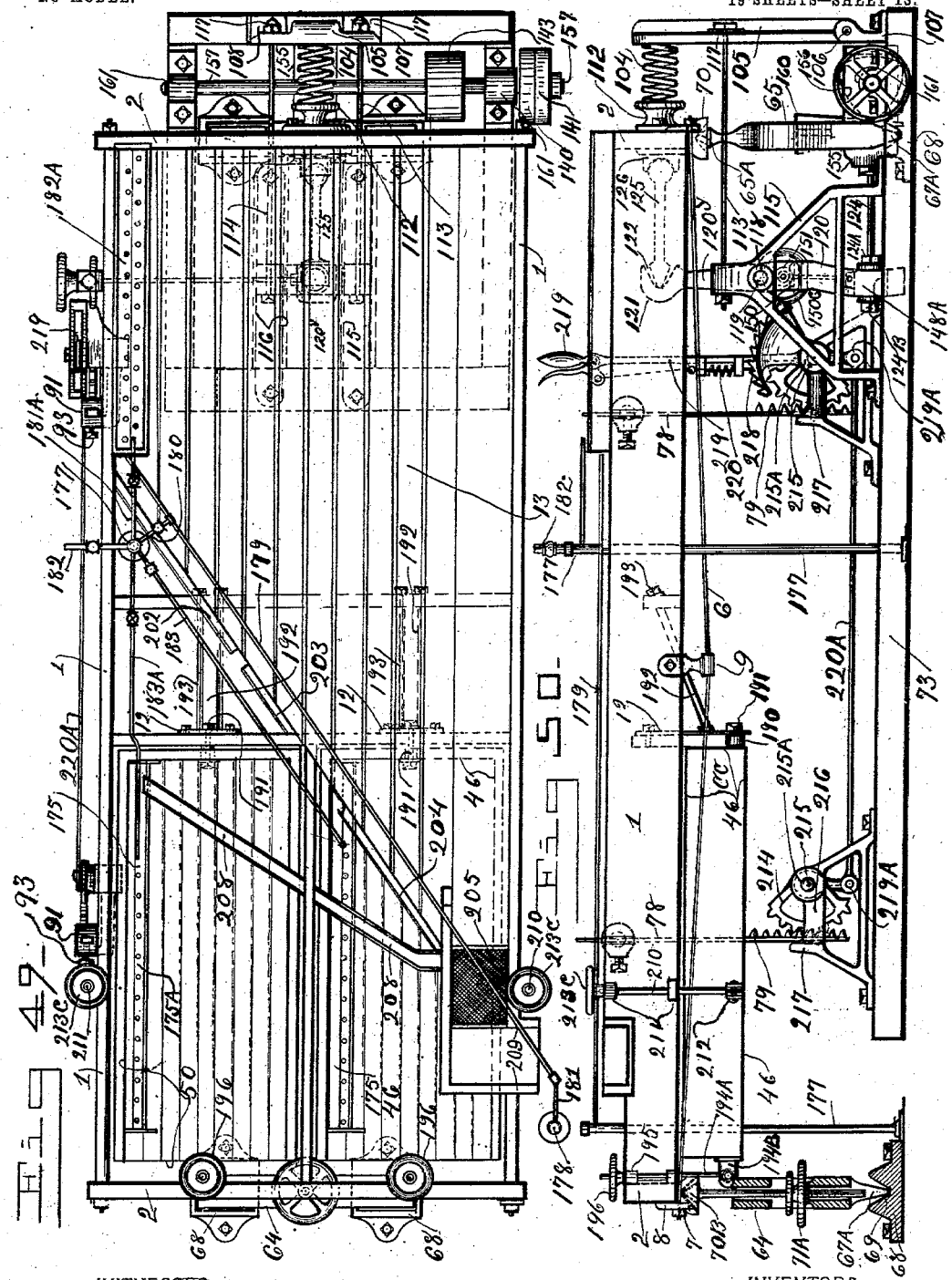
WITNESSES:
Bessie Thompson
Claude A. Dunn
INVENTORS.
Howard S. Bailey.
BY William E. Wild.
H. S. Bailey ATTORNEY.

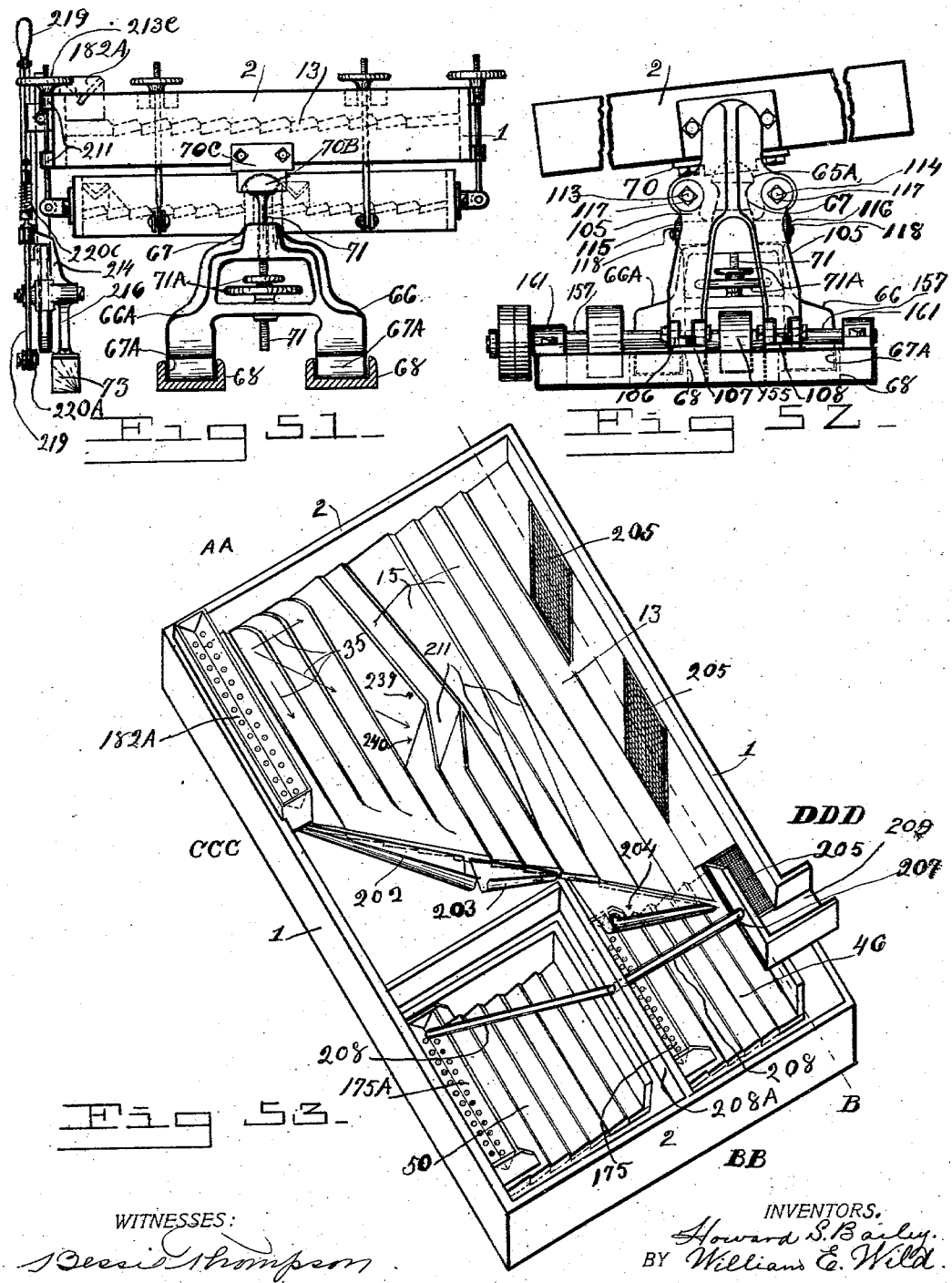

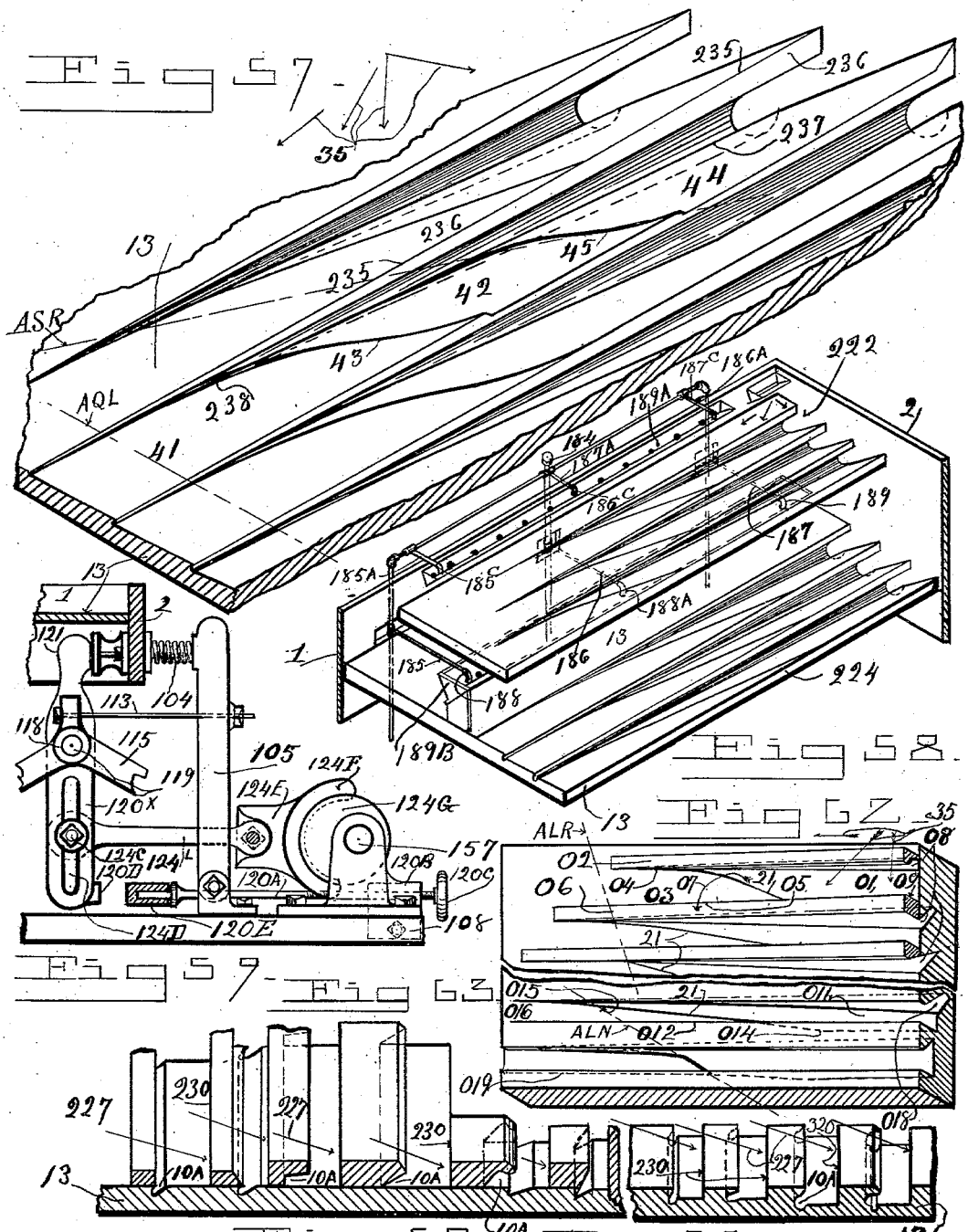

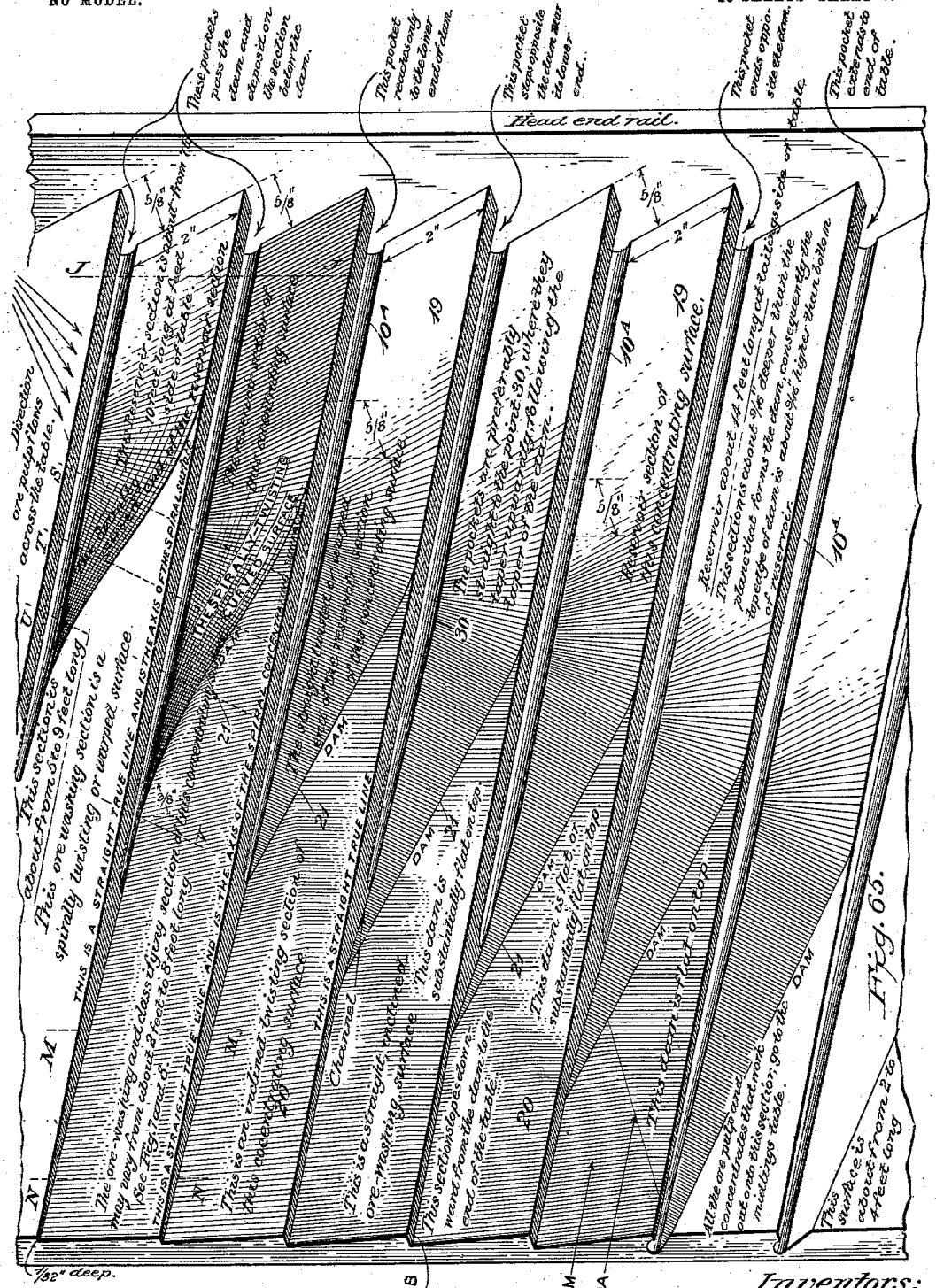

No. 751,971. PATENTED FEB. 9, 1904.
H. S. BAILEY & W. E. WILD.
ORE CONCENTRATOR.
APPLICATION FILED FEB. 14, 1901.
NO MODEL. 19 SHEETS—SHEET 17.
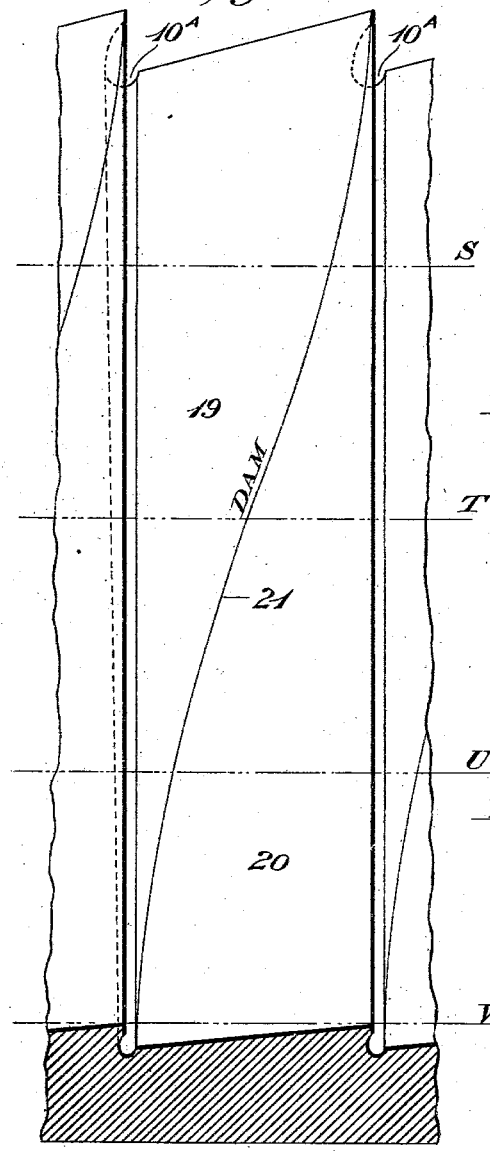
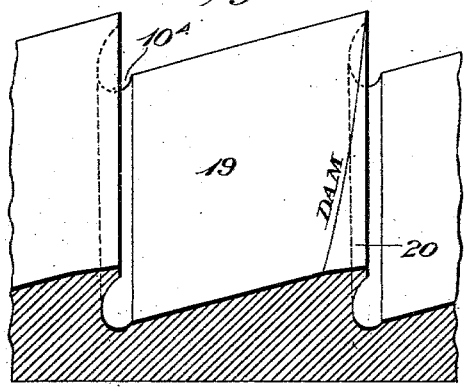
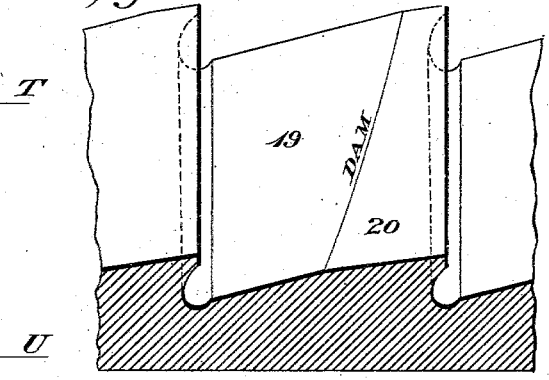
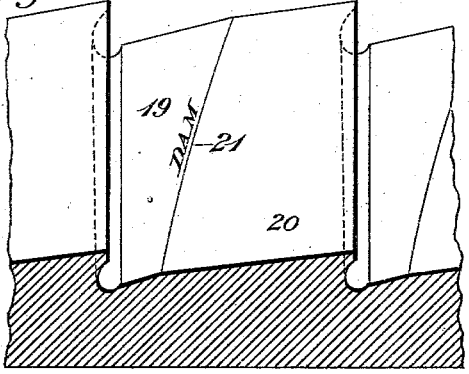
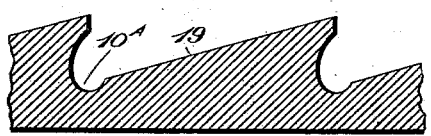
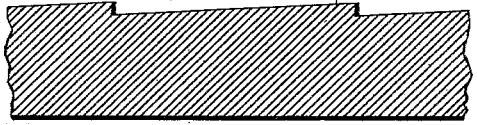

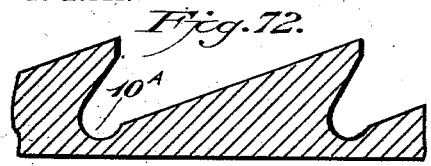
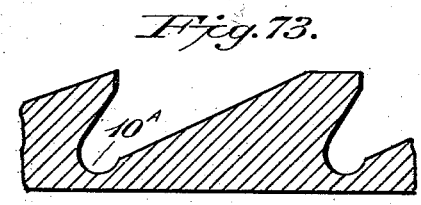
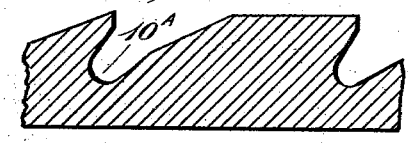
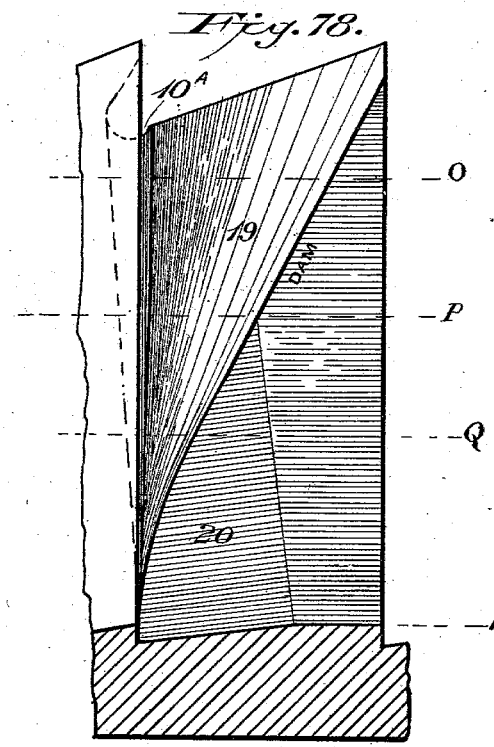
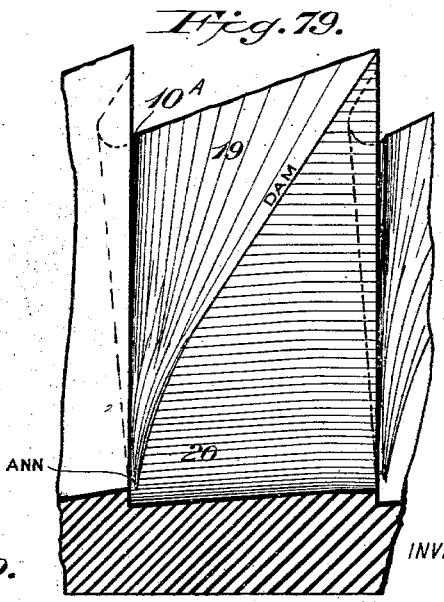

No. 751,971. PATENTED FEB. 9, 1904.
H. S. BAILEY & W. E. WILD.
ORE CONCENTRATOR.
APPLICATION FILED FEB. 14, 1901.
NO MODEL. 19 SHEETS—SHEET 19.
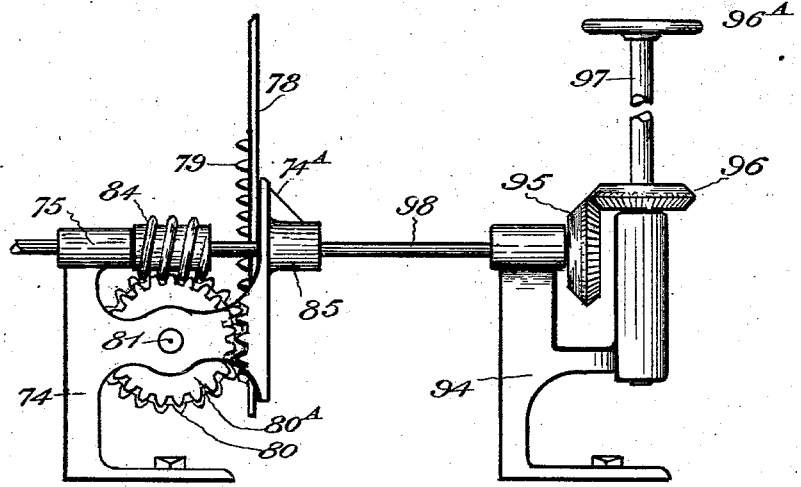
Fig. 81.
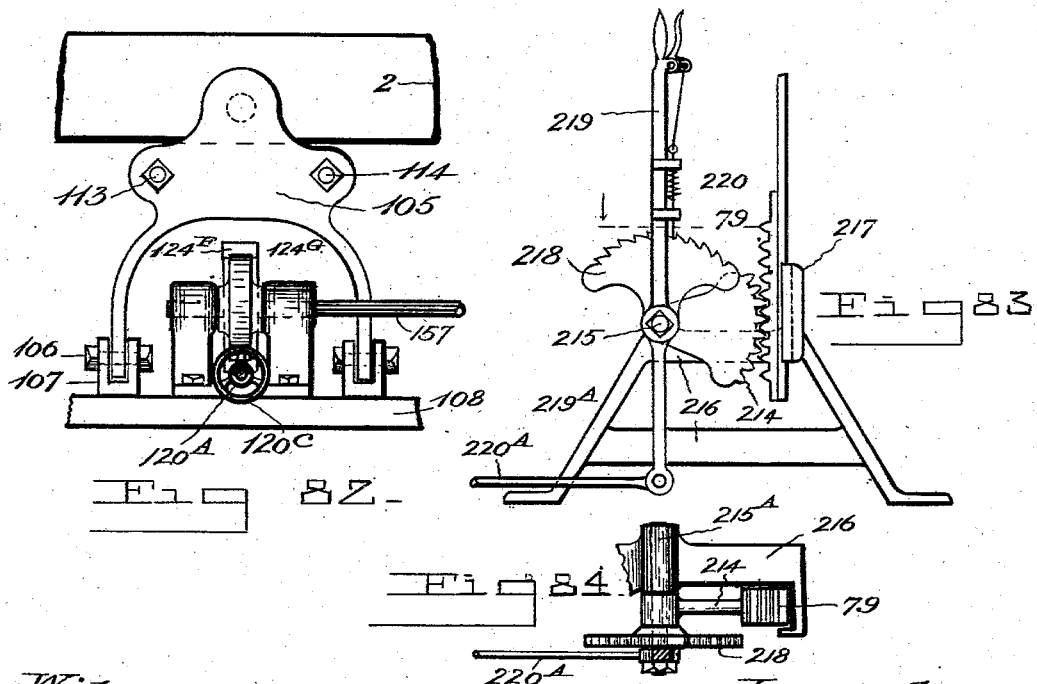
Witnesses: Inventors:
G. Sargent Elliott Howard S. Bailey
Grace P. Lindsley William E. Wild
By H. S. Bailey
Attorney.

No. 751,971. Patented February 9, 1904.

UNITED STATES PATENT OFFICE.

HOWARD S. BAILEY AND WILLIAM E. WILD, OF DENVER, COLORADO, ASSIGNORS TO THE MINING, MILLING, AND MACHINERY MANUFACTURING COMPANY, OF DENVER, COLORADO, A CORPORATION OF COLORADO.

ORE-CONCENTRATOR.

SPECIFICATION forming part of Letters Patent No. 751,971, dated February 9, 1904.

Application filed February 14, 1901. Serial No. 47,315. (No model.)

*To all whom it may concern:*

Be it known that we, HOWARD S. BAILEY and WILLIAM E. WILD, citizens of the United States of America, residing at Denver, in the county of Arapahoe and State of Colorado, have invented certain new and useful Improvements in Ore-Concentrators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in ore separators and concentrators; and the objects of our invention are, first, to provide an ore separating and concentrating machine having a reciprocating table supported on vertical knife-edge bearings; second, to provide a concentrating-table having knife-edge end supports at its ends only and resilient vertically-adjustable side supports adapted to assist to give to said table when under reciprocal movement a resilient vibratory tremble at each reciprocation; third, to provide a concentrating-table so light and flexible in its construction and so supported that when under reciprocal movement it possesses an elastic vibratory trembling motion that is of great benefit in concentrating ore; fourth, to provide a concentrating-table having a mechanism having free and loose connection with the table; fifth, to provide a concentrating-table composed of a plurality of reservoir portions and concentrator-surfaces; sixth, to provide a concentrating-table consisting of a plurality of intersecting reservoirs and stepped concentrating-surfaces, and, seventh, to provide a concentrating-table composed of a plurality of end-to-end intersecting inclined concentrating-surfaces of different inclined pitches having a section of steep inclination arranged to form a reservoir portion at their head end and a section of slight inclination adapted to form an ore washing and classifying portion at their tail or discharge end and in which there is a substantially longitudinally-arranged vertical step from end to end of the table between each pair of concentrating-surfaces, each independent pair of end-to-end concentrating-surfaces constituting a complete concentrating element in itself; eighth, to provide a concentrating-table consisting of a plurality of ore receiving and holding recesses having an ore-receiving portion of any form of cross-section at their head or feed end and a portion at their tail or discharge end slightly inclined from a flat surface and having said ore-receiving portions and said slightly-inclined portions and said concentrating-surfaces, which have different inclinations, contain intermediate of their ends a diagonally-arranged ridge portion emerging from the lower side of said slightly-inclined portions of said concentrating-surfaces extending across the said sections in a direction to form an oblique ridge, bar, or dam to the lay of the concentrating-surfaces and at substantially a transversely-inclined angle to the direction the ore-pulp is flowing across the table in and having the bottoms of said concentrating-surfaces inclined upward, so that the ore-pulp in flowing over them will flow uphill to provide a step between each concentrating-surface over which the ore-pulp drops into the lower side edge of the next concentrating-surface and an ore-pocket in the face of each step positioned out of the direct path and action of the flowing current of the ore-pulp as it flows across the table, which is arranged to convey the ore-concentrates from the reservoir portion of said ore-holding recesses and of said concentrating-surface adjacent to said head portion under the reciprocating action of said table along the side of the step to or adjacent to the lower end of the dam and to the slightly-inclined ore-washing portion of said concentrating-surfaces; ninth, to provide a concentrator which consists of a plurality of intersecting concentrating-surfaces over which the ore-pulp can freely flow without obstruction and so coöperatively arranged and positioned that their lines of intersection form boundary-lines which form reservoir portions at the head or feed end of the table in which the ore-pulp collects and the mineral separates from it and a classifying and washing portion, which may consist of slightly-inclined portions blending into perfectly flat unbroken or slightly-broken surfaces at the tail or discharge end of the table over which the separated mineral and such ore-pulp as feeds from the reservoir portion onto this washing portion is washed practically free and clean from all ore-pulp, and to provide means for reconcentrating a portion of the ore-pulp. We attain these objects by the mechanism illustrated in the accompanying drawings, in which—

Figure 1 is a plan view of our ore separating and concentrating table. Fig. 2 is a longitudinal section of Fig. 1 on line A A, the middlings-table and some of the parts below the table being shown in section. Fig. 3 is an enlarged end elevation of the discharge end B B of Figs. 1 and 2. Fig. 4 is an enlarged end elevation of the feed end A A of Figs. 1 and 2, the tilting mechanism and middlings-table and some minor features being left out of this view, as they would be simply a repetition of Fig. 3. Fig. 5 is an enlarged perspective view of a table, showing the concentrating-surfaces and the tapering pockets enlarged to more clearly show their construction. Fig. 6 is a perspective view of a table portion only, showing the plain single concentrating-surfaces that form the principle of our ore separator and concentrator. Fig. 7 is a perspective view of a table only, showing the double concentrating-surfaces with the two sections of the concentrating-surfaces intersecting each other with a long intersecting diagonal line between them. Fig. 8 is a perspective view of a table only, showing a table composed of concentrating-surfaces divided into two sections intersecting each other with a short diagonal ridge or bar or dam portion separating the sections of the concentrating-surfaces. Fig. 9 is a full-size section of a concentrating-surface, taken across the head end of the table. Fig. 10 is a fragmentary perspective view of a table embodying four equivalent elements or modifications that illustrate the principal action of the concentrating-surfaces. Fig. 11 is an enlarged fragmentary perspective view of a table embodying our invention, showing the head end of the concentrating-surfaces and the tapering pockets at their bases. Fig. 12 is an enlarged fragmentary perspective view of the concentrating-surfaces, showing two forms of steps or walls between each concentrating-surface, one with a pocket and one without, and also showing a covering of rubber or other suitable material. Fig. 13 is an enlarged fragmentary sectional view of the discharge end of the table, showing the adjustable device that supports the discharge end of the middlings-table. Fig. 14 is an elevation of the fragment shown in Fig. 13. Fig. 15 is a fragmentary elevation of the support for the head end of the middlings-table. Fig. 16 is a sectional view of the fragment shown in Fig. 15. Fig. 17 is a sectional view of the pivotal supporting-bolt that supports the discharge end of the middlings-table. Fig. 18 is a fragment in side elevation of the spear-head or knife-edge support for the table. Fig. 19 is a perspective view of a frame-and-ratchet locking-segment used on the adjusting device that tilts the table of the concentrating-machine shown in Fig. 49. Fig. 20 is a section of the chute under the edge of the table shown in Fig. 53 on line B of that figure. Fig. 21 is an enlarged fragmentary view in section of the discharge end of the table shown in Fig. 1. Fig. 22 is an elevation of the fragment shown in Fig. 21. Fig. 23 is a sectional end elevation of the discharge end of the main table through the discharge-chute. Fig. 24 is a fragmentary sectional end elevation of the main and middlings table and the water-distributing pipes shown in Fig. 1. Fig. 25 is an enlarged side elevation of the water-pipes shown in Figs. 1 and 2. Fig. 26 is an enlarged end elevation of the water-distributing pipes shown in Figs. 1 and 2, illustrating a modification of the arrangement shown in Figs. 24 and 25. Fig. 27 is a side elevation of the water-distributing pipes shown in Fig. 26. Fig. 28 is a section of one of the water-distributing pipes shown in Figs. 26 and 27 on line C of Fig. 27. Fig. 29 is an enlarged end elevation and an end sectional fragmentary view of the main table and the mechanism shown in Figs. 1 and 2 that tilts its sides. Fig. 30 is a side elevation of the tilting mechanism shown in Fig. 29. Fig. 31 is a fragmentary sectional view through the boxes of the crank-lever on line D of Fig. 36. Fig. 32 is an end elevation of the bracket shown in Figs. 29 and 30. Fig. 33 is a plan view of part of the device shown in Figs. 29 and 30. Fig. 34 is a sectional plan view on line E of Fig. 36. Fig. 35 is a vertical end section view on line F of Fig. 36. Fig. 36 is a side sectional view in elevation on line G of Fig. 37 and an enlarged side elevation in section of the crank-lever shown in Figs. 1 and 2. Fig. 37 is a plan view of the crank-lever shown in Fig. 36 and an enlarged view of the crank-lever shown in Figs. 1 and 2. Fig. 38 is an enlarged end elevation, partially in section, of the reciprocating mechanism shown in Figs. 49 and 50. Fig. 39 is a section through Fig. 38 on line H and is an enlarged sectional side elevation of the mechanism shown in Figs. 49 and 50. Fig. 40 is a fragment of Fig. 38, showing a plan view of the cam and its surrounding hood. Fig. 41 is a sectional plan view on line I of Fig. 38. Fig. 42 is a perspective fragment of a concentrating-table, illustrating the direction of travel and the substantial action of the pulp and mineral as they move across it. Fig. 43 is a section on line J of Fig. 42. Fig. 44 is a section on line K of Fig. 42. Fig. 45 is a section on line L of Fig. 42. Fig. 46 is a section on line M of Fig. 42. Fig. 47 is a section on line N of Fig. 42. Fig. 48 is a full-size section of two concentrating-surfaces and shows the direction in which the pulp flows over and the substantial action of the pulp and mineral as it passes over them. Fig. 49 is a plan view of a modification of our ore separator and concentrator and illustrates a concentrating-machine provided with a main table and a middlings and sliming tables. Fig. 50 is a side elevation of the structure shown in Fig. 49. Fig. 51 is an end elevation of the discharge end of the device shown in Figs. 49 and 50. Fig. 52 is an end elevation of the feed end of the device shown in Figs. 49 and 50, some of the minor parts shown in these figures and in Fig. 51 and the lower tables being left off. Fig. 53 is a perspective view of the three tables shown in Figs. 49 and 50. Fig. 54 is a modification of the reciprocating device shown in Figs. 1 and 2 and in the crank-lever shown in Fig. 36. Fig. 55 is an end elevation of the rock-arm shown in Fig. 54, and Fig. 56 is a plan sectional view of the device shown in Fig. 54 on line P. Fig. 57 is a perspective fragmentary view of the table, showing several inclined concentrating-surfaces of different inclined pitches—that is, different pitches both transversely of the width of the table and also of different pitches or heights longitudinally of the length of the table—and having ridges or dams or bars extending diagonally across the stepped riffles at different heights. Fig. 58 is a fragmentary perspective view of a modification of our table, showing the table portion arranged in a series of steps in different vertical planes and the concentrating-surfaces of each step provided with its own water-supply. Fig. 59 shows a modification of the actuating element of the reciprocating mechanism. Fig. 60 is a fragmentary section of the substantially rectangular-shaped form of riffle, showing how our ore-pocket could be applied to it. Fig. 61 is a fragmentary section of the common form of recessed riffles, showing how our pocket could be applied to them. Fig. 62 is a fragmentary perspective view of a table containing the common form of riffles and illustrating the application of our intersecting-concentrating-surfaces system and ore-pockets to them; and Fig. 63 is a fragmentary perspective view of a table, showing the common form of recessed riffle and illustrates the application of our intersecting-concentrating-surfaces system and ore-pocket to it. Fig. 64 is an enlarged perspective fragment of the discharge end of the main table shown in Fig. 53. Fig. 65 is a perspective view of a fragment of our concentrating-table, showing in an enlarged view the manner in which in practice we arrange the concentrating-surfaces and dams. Fig. 66 is a plan view of a full-size section of each of the concentrating-surfaces at the dam. Fig. 67 is a full-size section of the concentrating-surface across the line J J of Fig. 65. Fig. 68 is a cross-section of Fig. 66 on line S and enlarged section across either of the two concentrating-surfaces of Fig. 65 in the same line. Fig. 69 is a cross-section of Fig. 66 on line T and an enlarged section of either of the two concentrating-surfaces of Fig. 65 on the same line. Fig. 70 is a cross-section of Fig. 66 on line U and an enlarged section of either of the two concentrating-surfaces on the same line. Fig. 71 is a cross-section of Fig. 65 on line N N. Fig. 72 is also a cross-section of the head end of the concentrating-surfaces on line J J of Fig. 65 or of line J of Fig. 42 and would be a cross-section of the section of concentrating-surfaces shown in Fig. 78 if the concentrating-surface was continued to its head end. Fig. 73 is a cross-section of Fig. 78 on line O. Fig. 74 is a cross-section on line F of Fig. 78. Fig. 75 is a cross-section on line Q of Fig. 78. Fig. 76 is a cross-section of Fig. 78 on line R. Fig. 77 is a section of Fig. 65 on line MM and would be a section of the concentrating-surface shown in Fig. 78 if that surface was continued to its discharge end. Fig. 78 is an enlarged section of the concentrating-surface marked ANM in Fig. 65. Fig. 79 is a fragmentary section of the spiral concentrating-surfaces shown in Fig. 65 and illustrates a curved or rounded incline at and adjacent to the dam, and Fig. 80 illustrates the discharge end of the concentrating-surfaces. Fig. 81 is a detail side elevation of the worm-gear mechanism for adjusting the spring-supports. Fig. 82 is a detail end elevation of the reciprocating mechanism shown in Fig. 59. Figs. 83, 84 are a side elevation and a plan, respectively, of the rack mechanism which may be used for adjusting the spring-supports.

Similar letters and figures of reference refer to similar parts throughout the several views.

Referring to the drawings, the numeral 1 designates the side pieces of the frame of the main or top table of our ore separator and concentrator, 2 the end pieces, and 3 the cross-braces. These are suitably framed together.

4 designates transverse stay-bolts, which contain threads and nuts 5 at their ends. These bolts are placed alongside of the cross-pieces and extend through the sides and bolt the sides and cross-pieces together.

6 designates longitudinal truss-rods which extend along each of the side pieces. They are provided with threaded ends and nuts 7 and are bolted at their ends to a casting 8, that extends around and is bolted to each corner of the sides and ends. At the center of the length of the sides a saddle-casting 9 is bolted, against the depending end of which the central portion of the truss-rods bear. A transverse truss-rod 11 extends from the saddles to under the lower end of a depending bracket 12, that is secured to the adjacent cross-piece and supports the feed or head end CC of the middlings-table. (See Figs. 23 and 15.)

The concentrating-table 13 is secured between the sides and ends on the cross-pieces in any suitable manner and is made of any suitable material, such as wood or metal or a combination of both, and may be covered with any suitable material, such as rubber, oilcloth, linoleum, or any pliable fabric 14, as shown in Fig. 12. We prefer to use, however, California redwood for the table and not to cover it with anything, as this wood possesses a surface peculiarly adapted for the wet concentration of ore.

Our table consists of a plurality of concentrating-surfaces 15, arranged in successive order in such a manner as to form a step or wall between the upper edge of each concentrating-surface and the lower edge of the adjacent concentrating-surface. The concentrating-surfaces may vary from preferably about one inch to about two inches in width by from about fourteen to seventeen feet in length. We preferably make them about two inches wide, as shown in Fig. 48, which is a full-size section, by about twelve to sixteen feet long and preferably place from twenty-eight to fifty concentrating-surfaces in a table. These concentrating-surfaces are arranged in different ways and groupings. As Figs. 1 and 2 are necessarily drawn to so small a scale that their form and characteristics cannot be clearly shown, separate illustrations of the table portion alone are shown in Figs. 5, 6, 7, 8, 9, 10, 11, 12, 24, 53, 57, 58, 62, 63 to 80, inclusive, in which their various arrangements are shown.

Figs. 6 and 12 illustrate two similar forms of the concentrating-surfaces. The character of the step between them, however, is entirely different. It is made with a sharp inclination at or adjacent to its head or feed end and ends in preferably a slightly-inclined concentrating-surface, although it may end in a flat portion at the discharge end of the concentrating-surfaces, and the highest edge of each concentrating-surface is a straight line along its entire length. In both of these figures the concentrating-surfaces is preferably a continuous gradual spiral curve or warped or twisting pitch from one end to the other. At the feed end AA—that is, the end of the table on which the pulp is first fed, (and by "pulp" we mean the pulverized ore and water—that is, rock, mineral, and water mixed into a thin flowing stream)—the surface of each is given a sharp downward pitch, so that it presents to the flowing pulp, which flows over it in the direction of the arrows 17, an oblique face, which causes the pulp to flow uphill as it flows over each concentrating-surface, as further shown in Figs. 48, 42, and 10.

From the edge of the feed end to the opposite end of each concentrating-surface they curve with a natural twist to their opposite ends, which ends in preferably a very slight downward inclination or angle to a horizontal plane, as shown very clearly in these figures. Thus in Fig. 6 each concentrating-surface at the feed end pitches down at quite a sharp angle toward the feed side CCC, and the step between them is quite deep, while at their opposite or discharge ends they are very shallow, not exceeding in the concentrating-surfaces on the feed side CCC of the table preferably a sixty-fourth or a thirty-second of an inch. Thus the line 18 in Figs. 6, 7, 8, 12, and 42 represents a line in a horizontal or flat plane, and it can be seen that each concentrating-surface slopes slightly downward toward the feed side CCC of the table at a slight inclination to the horizontal plane. We sometimes gradually increase the depth of the steps and inclination or downward pitch and slope of the concentrating-surfaces from the feed side of the table to the discharge or tailings side DDD of the table, as is indicated in Figs. 5, 7, 8, while we preferably arrange a predetermined portion of them from the feed side toward the tailings-discharge side of equal or substantially equal depths, and the balance deeper or increasing deeper to the tailings-discharge side for the general run of ores, as shown in Figs. 1, 6, 8, and 42, in each of which figures a number of the surfaces along the feed side are shown of substantially the same depth. The reverse arrangement gives better results on light-weight and heavy-weight ores, it being better to make them deeper on the feed side for light ores and deeper on the discharge side for heavy ores. The steps 10 are shown in Fig. 12 extending from the top edge of one concentrating-surface at an outward angle down to the lower edge of the adjacent step. It is, however, immaterial whether where this form of step is used it inclines outward or inward under the top edge of the concentrating-surface or is straight down. This form of step, however, is best adapted to coarse concentration, and this form of concentrating-surface is also adapted to coarse concentration, and we have found in practice that where fine concentration is desired it is necessary to get the fine material out of the action of the current of the flowing pulp. In order to do this, we form in the face of each step a pocket 10$^A$, which, owing to its natural lay of the concentrating-surfaces, is a tapering pocket. This tapering pocket is illustrated in all of the views of the concentrating-surfaces except Figs. 12, 49, 51, 53 and represents the preferred construction of the steps, and by its use we are able to save substantially all free mineral that is heavy enough to sink in the pulp or that does not float on top of the water. These tapering pockets are placed laterally in the sides of the steps and are placed wholly out of the natural forward flowing-path of the water and ore and pulp. Consequently the mineral as it settles down through the pulp while it is going through the operation of stratification is carried down into these pockets, and it is impossible for it to get out after it is once in them, and under the reciprocating action of the table it is fed along these tapering pockets to their ends, when it feeds out onto the concentrating-surfaces of less pitch or inclination, which may, if desired, blend into a perfectly flat smooth portion at the discharge end, as shown in Fig. 5, adjacent to the feed side CCC, as will be described more fully hereinafter.

We have found in practice that while the straight even spiral twist makes a fine separator on coarsely-pulverized ores—say from ten to forty mesh—that when very finely pulverized ore—say from forty to five hundred mesh—is run over them that the very fine ore does not have time to settle into the pockets, and being extremely fine and light it is apt to be moved by the slightest movement of the pulp. Consequently we found it necessary to adapt the concentrating-surfaces to hold this very fine ore longer in the concentrating-surfaces than would be necessary with coarsely-pulverized ore, with the object of allowing very fine mineral more time in which to be sifted down through the pulp onto the surface of the concentrating-surfaces and from them into the pockets. In order to accomplish this without decreasing the capacity of our table, we preferably divide each concentrating-surface into two different sections of different pitches 19 and 20, arranging them end to end and preferably arranging them so that they intersect each other in a diagonal line, which we term the "intersecting line," or ridge or bar or dam 21 of these sections diagonally across the width of each concentrating-section in a diagonal direction across the path of the general movement of the pulp along each concentrating-surface, as is shown in Figs. 5, 7, 8, 10, and 12. These dams thus extend across each concentrating-surface from the head end and tailings-discharge side diagonally to their ore-pulp-feed side and concentrating-discharge end. The dams thus divide the concentrating-surface into two sections. The head end section we call the "reservoir section or portion" and the discharge end section we call "ore washing and classifying section." This division also changes the form of the concentrating-surface as the two sections are arranged at different horizontal levels, the reservoir section or portion being much deeper than the ore washing and classifying section. They are arranged, however, to blend into each other by an upward slope of the bottom of the reservoir into the edge of the dam. Consequently instead of one continuous unbroken concentrating-surface extending from one end of the table to the other, such as shown in Figs. 6, 12, 49, 50, and 53, we have a concentrating-surface of two different pitches that intersect each other as to the central portion of the table—that is, each concentrating-surface in Figs. 7, 8, 5, and 42 starts at the discharge end of the table at a slight inclination to or at substantially a horizontal plane and may continue straight or warped or spirally curved, as desired. Thus in Fig. 5 the straight lines 22 represent a horizontal plane or perfectly flat smooth surface, and from the end lines 23 of the three concentrating-surfaces of that figure, which should extend and in practice do extend to the end of the table, like those shown in Figs. 7 and 8, but are commenced on the flat portion for the purpose of illustrating the form of this section of the concentrating-surfaces in this figure, and consequently do not reach to the end of the table. From the point where the concentrating-surfaces commence on that flat smooth surface and also from the ends of those that extend to the end of the table they incline or spirally curve or twist deeper progressively along the step of the next surface above it or toward the ore-pulp-feeding side of the concentrating-surfaces to the intersecting line or dam 21. In order to illustrate this slight incline or spiral curve or twist of the concentrating-surfaces in this figure, we use a number of shade-lines 24, which we show diverging from the straight lines 23 in successive order with a gradual increasing slant that extends from the beginning or extreme end of each surface at the discharge end of the tables to the end of the intersecting diagonal line 21, these shade-lines 24 being used solely to indicate the spiral curve or twist of this end or section of the discharge end of the concentrating-surfaces. This gradual straight inclination or curve or twist or spiral form of this section of the concentrating-surface is also shown clearly between the points 25 and 26 of Figs. 7 and 8. From the diagonal line 21 of intersection, however, a second section of the stepped concentrating-surfaces of much steeper pitch starts in, as is shown by the curved shade-lines 27 in Fig. 5, which represent the pitch or twist of the second section. The difference in slope of these two sections is shown plainly in the sectional views, Figs. 43, 44, 45, 46, and 47, which are taken across Fig. 42 on lines J, K, L, M, and N, respectively, which cut the intersecting oblique lines of the five two-sectioned concentrating-surfaces shown in this figure. The second or head end sections of these concentrating-surfaces progress in either a straight or inclined or curved form to the extreme head or feed end AA of the concentrating-surfaces. Each section may be straight for a short distance, as is shown by the straight lines 28 and straight portion 29 of Figs. 7 and 8, up to the points 30, and thence straight, inclined, or curved, and we have arranged in some of the figures of the drawings the intersecting ridges, bars, or dams of these end-to-end inclined intersecting concentrating-surfaces to form an obliquely-arranged line or path across the table in the direction in which the ore-pulp flows.

The ore-pulp and its tailings is caused to flow across the table in a diagonal path. This diagonal path is the resultant angle of two forces moving at right angles to each other, the first of which is the longitudinal reciprocative movement of the table, which is represented in Fig. 1 by the arrow AY, and the second is the transverse side movement of the ore-pulp and wash-water flowing transversely across the table from the feed side to the discharge side, which is represented by the arrow AX. This diagonal path is designated in Fig. 1 by the dotted line AAA, while the first rush of the ore-pulp onto the table is represented by the arrows 17 in Fig. 6, and 12 and 35 in Figs. 10 and 42 and 81. The diagonal forward arrangement of the dams on our table, where we show a forward diagonal arrangement, is in all the figures the natural flow of the ore-pulp, but not of the concentrates. The diagonal angle the ore-pulp and tailings flow in varies a few inches by tilting the table slightly at different degrees above a transverse horizontal plane at the feed side. A slight tilt is necessary on all ores, and if the flow of either the water or ore-pulp is very irregular frequent tilting adjustment is necessary to maintain a proper separation and concentration of the mineral particles and the proper flowing angle of the ore-pulp and tailings. In the arrangement of the dams, which is shown in Figs. 10, 57, the gangue or tailings flow from each dam from the feed side of the table to the tailings-discharge side substantially ahead of the second and third, and clear ahead of all of the rest of the dams below it, while in the rearward arrangement shown in Figs. 10, 57, 62, and 63, as indicated by the rearward diagonal lines in these figures, each dam from the end side to the tailings-discharge side discharges its tailings ahead of all of the dams below the first dam below it. The material that leaves the dams in our concentrator is not ore-pulp and it is not concentrates—it is gangue matter or tailings. The ore-pulp feeds into the reservoirs and flows over their side edges and flows in all directions, filling the head end of the table from the head end rail to the dams, and the mineral particles that are in the mass below the top strata that flows clear across the table stratify and settle out of it onto the bottom of the reservoirs and into the tapering pockets, and the material that is left at the dams and that flows over the dams is gangue matter or tailings. Even if there was a little mineral in the gangue or tailings product, it would be so little as to be justly called "gangue or tailings." This gangue matter or tailings after it leaves the dams is free from the current of the ore-pulp that is flowing in a steady stream onto the table, and naturally flows in a more direct diagonal line across the table than the ore-pulp does, and whenever we use the forward diagonal arrangement of dams we arrange them at a steeper angle to the sides of the table than the natural angle the ore-pulp flows in, the object being to allow the tailings from each dam a clear path across the inclined riffled ore-washing surfaces below the the second or third or fourth dam below it, the clearance depending on the steepness of the angle. Thus in Fig. 1 the natural diagonal line of movement of the tailings would be parallel with the diagonal line AAA, which is the resultant angle of the two forces the tailings are subject to after they leave the dams. Consequently as the dams are arranged at a steeper angle than the natural diagonal path the tailings flow in each dam will discharge its tailings ahead of all the dams below the third or fourth or fifth dam below it, so that the tailings from the dams from the feed side of the table toward the discharge side do not flow into each other, but forward, beyond, ahead, and clear of the dams toward the tailings-discharge side of the table.

It is essential to the best concentration attainable that each dam discharge its tailings practically clear of each dam below it and entirely clear of all the dams below the second or third dam below each dam, as each dam is completely full and overflowing from the ore-pulp and tailings of its own individual reservoir. Consequently if the dam or dams above it should discharge more than a little of its gangue into dams directly below it the dams would be glutted and clogged and each dam would fail to satisfactorily discharge the gangue or tailings from its own individual reservoir. Consequently the dams while arranged diagonally forward in some of the views are when so arranged placed at an angle such as shown in Fig. 1, which is the only view that shows the proper relative relation between the concentrating-surfaces and the size of the table. The object of this arrangement is to give the gangue from each dam plenty of room in which to spread out into a flat sheet by itself, so that if there should be any mineral particles left in the gangue or tailings they may more easily settle onto and be caught by the inclined riffled ore washing and classifying portion below the dams when thus spread out into thin sheets than if all the tailings from the dams were bunched up together into one thick sheet or band, which would be the case if the dams were arranged in a flatter forward angle than the natural angle the tailings flow in.

In our table each concentrating element is independent of and does not in any way, shape, or manner coöperate with the concentrating surfaces or elements either above or below it, as on our table the ore-pulp and gangue or tailings flow in one direction, while the concentrates flow in an opposite direction from the ore-pulp or tailings. The concentrates from the reservoirs of each of our concentrating-surfaces are guided by the dam of the reservoir in which they stratify and settle away from the next dam below it in the opposite direction from the direction in which the ore-pulp and the tailings are flowing until they pass the dam, when they feed along their own individual ore washing and classifying inclined riffle-section, which is a continuation of the concentrating-surface in which they were separated from the ore-pulp. It will be noticed by reference to the drawings that we do not employ any set order of arrangement of the dams and do not confine ourselves to an arrangement of the dams in the direction in which the pulp flows, as in the drawings we show several angular arrangements of different degrees or pitch of the dams to the sides of the table, both in the direction in which the ore-pulp flows and also in a rearward or backward diagonal direction to the flow of the ore-pulp, and also in a right-angled direction to the sides of the table. The reason of this is that each one of our concentrating-surfaces, and consequently our dams, are independent of each other and do not coöperate with each other in their mineral separating and concentrating action. As each concentrating-surface is a complete concentrator in itself, they may consequently be arranged in any desired order and can be arranged in random order, if desired; but it is better to arrange them collectively in some predetermined angular path across the table, as they make a better appearance on the table, and the relative function of each section of each concentrating-surface is more severely maintained, providing the order of arrangement is in a diagonal path slightly forward of a right angle, as in Fig. 1, or slightly rearward of a right angle, as shown in Fig. 10, or, better still, at the angles shown in several parts of Fig. 10. In Figs. 5, 7, 8, 42, and 57, and others the true relations of the dams to the diagonal angle of the flow of the ore-gangue cannot be seen, as these views show the concentrating-surfaces in width all out of proportion to their length, and Fig. 1 is the only view that shows anything like the proper relation of the forward arrangement of the dams to the natural diagonal angle of movement of the ore-gangue.

In Fig. 10 in the concentrating-surface 41$^A$ and 15$^E$ we show the dams in different directions. The dotted line ASG and the dams it touches represent the right-angle arrangement, and the dotted line ASH and the dams it touches represent the rearward arrangement.

The two dams touched by the dotted line ALO on the feed side of Fig. 10 and also the two dams touched by the dotted line ALP at the discharge side of Fig. 10 are also at correct angles, and the three dams at the discharge side of Fig. 57, that are crossed by the dotted line ALQ, also show a suitable arrangement.

In Fig. 63 the two dams on the discharge side of the table show a rearward angle, as shown by the dotted lines ALN. Fig. 62 also shows one rearward arrangement, as indicated by the dotted lines ALR. Fig. 10 shows one pair of dams arranged in rearward order and five arrangements of riffles at different rearward angles, as indicated by the dotted lines ASH, ASI, ASJ, ASK, ASL, and ASM.

Fig. 57 also shows by the dotted line ASR a rearward arrangement of the dams. This makes eight views in the drawings in which the dams are shown arranged in a forward order of arrangement, seven views in which they are shown in intermediate angular arrangement, and several views in which they are shown in rearward order, showing that the arrangement of the dams across the table, as far as the separation and concentration of the mineral particles of the ore-pulp and the discharging of the gangue or tailings is concerned, is a matter of indifference, or at a slight rearward angle the ore-pulp is fed on the table through a feed-box 32, which is the same in section as the water-distributing box 175 in Fig. 24, which is secured in the corner of the feed end AA and the feed side CCC. This feed-box contains a downward-sloping bottom portion, as shown in Fig. 42, through which a slot 34 is cut that directs the pulp along the side rail of the feed side of the table, from which point it spreads out and flows across the table in the direction of the arrows 35 in Figs. 42 and 10, following in general an oblique course across the table.

Each individual pair of end-to-end sections of each one of the plurality of concentrating-surfaces we employ in the construction of our table comprises in itself a complete, perfect, and independent concentrator and does not and is not intended to coöperate with the concentrating-surfaces adjacent to it to continue or to carry on or finish any action on the ore-pulp that tends to a separation of the mineral particles from the gangue which it commences. It can be readily seen that the concentrating elements of our table are radically different from those in that type of concentrators embodied in Patents No. 590,675, No. 632,892, and No. 678,793, in which the concentrating-surface is composed of a plurality of longitudinally-arranged coöperating open-ended riffle elements of unequal lengths extending from the feed side to the discharge side of the table and extending a portion of the table's length from its head end and terminating in a smooth unriffled portion at the extremities of the riffles, the said riffles being arranged in such a manner that each riffle element from the feed side of the table down to its discharge side discharges the concentrates and a portion of the gangue and pulp onto the smooth unriffled portions and against the next riffles below it in such a manner that these coöperating riffle elements shelter and convey the concentrates across the table to its discharge-side end. The dams at the intersection of the two sections of each one of the concentrating-surfaces of our table not only prevent the concentrates from being washed over their top or reservoir-side edge into the next dam below, but they guide the concentrates backward in a substantially opposite direction from the direction in which the ore-pulp flows. We are very materially aided in preventing the concentrates from passing from one reservoir to another and from one dam to another and from one ore washing and classifying portion to another after they have once settled by the inclination of the intersecting sections that compose each concentrating-surface, which makes it necessary for the concentrates to travel uphill. This they do not do under natural or normal conditions; but under the short rapid reciprocal movement we give to the table they work up the inclines at the bottom of the reservoirs past the dam and spread out in a thin sheet over the ore washing and classifying sections, the heavier particles keeping next to the wall of the step and the lighter spreading over its surface.

The difference between the type of concentrators above mentioned and our concentrator is that in the type above mentioned it requires a plurality of coexisting and coöperating progressively-arranged open-ended concentrating riffle elements extending across a table to its discharge-side corner to make a separation of the concentrates and save them, while in our table we have as many independent concentrating elements as we have concentrating-surfaces. Thus we preferably use from twenty-eight to fifty independent concentrating-surfaces on our table, each one of which is a complete concentrator in itself. Consequently we have on our table twenty-eight independent concentrators grouped in one great concentrating-table. The intersecting diagonal line 21 between each pair of end-to-end sections of each concentrating-surface forms a bar or ridge or dam to the too-rapid movement of the bulk of the pulp held in the head-sections, which by means of the dam is formed into a reservoir, and the pulp must flow over the top side edge of the reservoir of each. Consequently when the reservoir portions of the concentrating-surfaces are full of pulp which is flowing naturally over them only the top of the pulp is washed over the top side edges and only a small portion washes over the diagonal dam 21. A body of pulp remains in them and is constantly being agitated and washed out and replaced by the flow of and action of the water, and a stratification of the mineral particles takes place under the rapid reciprocation of the table, which settles the mineral, no matter how fine it is, from the pulp onto the surface of the reservoir-sections of the concentrating-surfaces, as shown in Fig. 48.

After the mineral once gets onto the surface of the reservoir-section of the concentrating-surfaces it works backward against the forward flow of the pulp across the table down into the pockets, it being free to do this as it is out of the current of the flow of the pulp and because of the downward slope or inclination of the concentrator-surfaces and also by the rapid vibration of the table and an undersuction of a portion of the water that flows into the pockets, as indicated by the arrows 36 in Fig. 48, the action of which will be more fully described hereinafter as well as the separating action of the ridge, dam, or bar 21 and of the tapering pockets as they emerge or blend into the slight slope of the concentrating-surfaces at the intersecting line and at and adjacent to their discharge ends.

The intersecting diagonal ridge or dam 21 forms an oblique bar across the intersection of the two sections of the concentrating-surfaces, which is similar in its effect on the flowing pulp to the obliquely-inclined projecting pieces 37, which we preferably make wedge shape. These projecting pieces are secured to the top of the concentrating-surfaces in the sections $15^A$ and $15^B$ of Fig. 10, preferably diagonally from the top edge across the section to near the tapering pockets, and they operate to turn the heavier particles of pulp and mineral that strike against them as the pulp flows across the table—that is, as the pulp flows across the concentrating-sections it strikes against them and its uphill course over the concentrating-surfaces is checked—which allows or gives the heavier particles a chance to settle and also changes the direction of movement of the mineral particles toward the pockets underneath the top edge of each concentrating-surface. During the development of the concentrating-surfaces we applied them to note their effect. They were not used, however, to keep the pulp from flowing over the top edge of the concentrating-surfaces, but were used solely to keep the pulp from flowing too fast along the concentrating-surfaces toward their discharge ends. The principle upon which they act is, however, similar to that of the intersecting line or dam 21 between each pair of end-to-end concentrating-surfaces, and their use led to the adoption of the intersecting sections of concentrating-surfaces and the diagonal intersecting line or bar 21, which simply operates to hold back in the head or feed end section of each concentrating-surface a body of ore-pulp for a bed, from which the lighter particles of pulp are carried over the top of the diagonal bar and the top edge of the reservoir-section of the concentrating-surfaces, while the mineral settles down through the pulp and works down into the pockets along which it feeds, sheltered from the flowing water and pulp until it feeds out of the pockets which form the concentrates washing and classifying portions of the concentrating - surfaces. The concentrates work out of the pocket over the concentrates-washing sections, as shown by the dotted lines 38 in Fig. 42, where any remaining silica or tailings matter is washed from the mineral, as will be more fully described hereinafter. Strictly speaking, each of these concentrating-surfaces comprises two inclined surfaces of different pitches intersecting each other between the ends of the table and arranged so that their line of intersection forms a diagonal ridge, bar, or dam across the different pitches of the two inclined sections of the concentrating-surfaces and so arranged that the diagonal ridge or bar or dam and the head end of the table forms an ore-pulp reservoir and the slightly-inclined section between the diagonal ridge or bar or dam and the discharge end of the machine forms a concentrating and ore - pulp washing and classifying portion. In addition to the stepped sections of the concentrating-surfaces a tapering pocket or channel is formed in the steps or walls of the reservoir-section, which is arranged and adapted to collect and to convey the ore concentrates either past the dam onto the inclined section below it or opposite to the dam and then through the narrow channels ANN, Fig. 79, between the dam and the steps or to the lower end of the dam, as shown in the several reservoir-sections. The dam is sometimes inclined slightly down toward the step, as shown in the section in Figs. 68, 69, and 70 of Fig. 66; but sometimes we raise it and make it of the same height across its reservoir edge as the lower side of concentrating - surface on which it occurs, which is always preferably a straight true line from one end of the table to the other. Owing to the peculiar form and to the different pitches of these two sections of each concentrating-surface, it is necessary to work each out by hand, except we design and build a very complicated set of machine-planer cutters of special forms, and in finishing off the top of the table the lower terminal side edge of each concentrating-surface is preferably made of the same height across as well as lengthwise of the table, so that a straight edge laid transversely on them at a transverse angle will show a substantially level surface from one highest edge to the other, or, in other words, so that the straight edge will substantially touch the high side edge of each concentrating-surface at any part of the table, and the dams which always die out into the high side edge are apt in the leveling of the table to a straight edge to vary in the exact form or outline of their top portions, some being inclined down toward the steps from the very edge of the highest side edge of the concentrating-surfaces, while others are of an even height for a portion of their length and others are of an even height for their whole length, and their level portions may in leveling up extend back from the whole length of their reservoir edge to close to or they may die out into the top of the side edge of the concentrating-surfaces, of which they form a part, as shown in Figs. 78 and 80. The top edges of the dams are always from about one-half to three-quarters of an inch higher than the bottom of the reservoirs, and the lowest part of the ore washing and classifying portion is always from about one-eighth of an inch to one-half of an inch above the bottom of the reservoirs. The reservoirs from the edge of the dams incline down with either a straight sloping incline or with a curved twisting incline or with a spirally curved or warped surface to the bottom of the reservoirs into which it blends, the reservoir being preferably made straight from the point where this sloping surface of the reservoirs and dams blends into them to the head end of the table. It does not make any material difference as far as a good concentration of ore is concerned whether we twist these two sections of the concentrating-surfaces a little or quite a good deal at and adjacent to the dams or whether we spirally curve them a little or a good deal or whether we leave the spiral curve or twist out altogether and make the sections straight, which of course is the easiest and the cheapest. We have made them in all ways. In fact, we have made some tables on a straight incline from the discharge end to the dam, others inclined and twisting spirally or curving gradually and progressively from the end to the dam, and others partially straight and partially twisting, in which the sections at the discharge end are deeper than at the dam, as shown in Fig. 65 at AAB; but this section is a straight incline. Consequently, as stated above, the spiral or the curve or the twist in the two sections at and adjacent to the intersecting ridge, dam, or bar are minor details, the principal elements being the two intersecting sections of concentrating-surfaces of different pitches, the one section—that is, at the head end of the table—being made into an ore-pulp-holding reservoir by the diagonal intersection of the other, which forms a dam across it, and the other section of which forms a concentrates washing and classifying portion at the discharge end of the table at the end of the reservoir-section. In practice it is the same way with the pocket or channel. In some machine and in some reservoirs of the same machines we have extended them by the dam onto the section below the dam, in others we extend it to the lower edge of the dam, and in others opposite the dam, allowing it to die out in the reservoir at or close to the end of the dam—that is, close to the end of the channel between the dam and the adjacent step or wall.

In the concentrating-surfaces $15^c$ and $15^D$ of Fig. 10 from the feed side CCC we illustrate a second modification of the concentrating-surfaces. This modification consists of forming in the downward-sloping surface of each concentrating-surface, particularly at their head ends, one or more grooves 40, placing them at an angle or diagonally across the surface in order that their sides may face or lie at substantially right angles to the general direction to the flow of the pulp. A number of these diagonal grooves may be placed in each concentrating-surface and may extend from the head end to near the end of the tapering pocket, and their lower ends should intersect the tapering pocket. They serve as channels to lead the mineral into the tapering pocket and may be of any desired form of cross-section. The form shown at 41 is preferable. In the concentrating-surfaces of Fig. 10 we illustrate a third arrangement of the simple concentrating-surface, which consists in dividing each concentrating-surface into three or four or more intersecting concentrating-surfaces of different pitches, each portion being a little deeper than its succeeding portion. Thus the shallow or discharge portion $41^A$ is the highest. The portion 42 curves or slopes down from its intersecting line 43 to a little lower step, and the portion 44 curves or slopes down from the intersecting line 45 to the head end of the concentrating-surface. In the concentrating-surface $15^F$ of this figure four concentrating-surface portions of different pitches and three intersecting lines or dams are shown, and any number of these intersecting cencentrating-section portions may be placed in the length of a concentrating-surface, and their use would be advantageous when treating an ore containing a number of metals of different specific gravities and degrees of fineness. These different sections could start from the top edge of each concentrating-surface, which is preferably a straight line from end to end of each concentrating-surface in all of the tables shown in all of the figures, or the top edge of each concentrating-surface could be stepped down slightly, as shown in Fig. 57.

In the concentrating-surface section $15^G$ of Fig. 10 we illustrate another modification of the concentrating-surface arrangement which might be used on some or all of the concentrating-surfaces of our table. This modification consists of placing one or more riffles 43 on the downwardly-inclined slope of the head-section of each concentrating-surface. These riffles are preferably made tapering from the head end to their opposite point, and their upper side faces are preferably provided with a pocket $10^B$ under their edge, as shown on the upper riffles.

In the section $15^H$ we show still another modification, which consists in placing one or more grooves $40^A$ of any desired form of cross-section along one or several or all the head-sections of the concentrating-surfaces of a table. These grooves are preferably wedge-shaped—that is, deeper at the head end of the concentrating-surface and tapering out shallower at the short slope or twist below the diagonal intersecting bar or dam 21 and their terminal ends are preferably curved down toward the tapering pockets.

In the concentrating-section $15^I$ of Fig. 10 an additional modification of the concentrating-surfaces is shown, which consists in turning the head end of the head-sections up toward the head or feed side of the table, and in Fig. 53 this arrangement of the sections is shown in three complete concentration-surfaces near the feed side of the table, and in addition the discharge ends of these concentrating-surfaces in Fig. 53 are curved down toward the tailings side of the table.

In Figs. 49 and 50 an additional modification of our concentrating-surfaces of different-pitches table is illustrated, in which the principle as shown in Fig. 12 is adapted; but the table is cut off at its discharge end diagonally or substantially the line of direction the pulp flows across it, and in addition to the middlings-table 46 (shown in Figs. 1 and 2) a sliming-table 50 is also added; otherwise the machines shown in Figs. 49 and 50 do not differ essentially from the machine shown in Figs. 1 and 2.

The several modifications are simply additions to our single and double and plural systems of concentrating-surfaces and the tapering pocket sheltered under the overhanging lip of the top edge of each concentrating-surface, and each one of these modifications may be applied to one or more concentrating-surfaces of a table, or a combination of these modifications could be applied to the concentrating-surfaces at different parts of a table. We may give to the concentrates washing and classifying section of the concentrating-surfaces several different forms, as follows: First, they can be given a progressive inclined twist or an inclined curve or spiral twist or curve from or adjacent to the discharge end of the table to the dam, as shown in Figs. 5, 7, 8, and in the two concentrating-surfaces in Fig. 80 marked "This is a twisting plane." The dams are preferably made three different ways—first extending from the lower edge of the twisting or of the straight inclined section at the step side diagonally across the reservoir or head end section toward the head end of the table and sloping up progressively until it dies out into the top edge of the section. Consequently at the point where it joins the top edge of the reservoir-section it is of the same height, while at the point at the side of the step it starts from it is as much below the top edge of the adjacent concentrating-surface as the concentrates-washing section itself, as the dam is simply a continuation of the concentrates-washing section in a diagonal line across the reservoir-section until it dies out in the top edge line of that section. As before stated, the reservoir-section is made with a straight or curved or twisted or with a spiral slope from the edge of the dam to where it blends into the straight bottom of its inclined section.

The inclined section of the concentrating-surfaces that extends from the dam to the discharge end of the table we call the "concentrating washing and classifying portion," because the mineral particles that settle in the reservoir-sections concentrate into the pockets and work through the pockets and channels past the dam and discharge into the slightly-inclined section beyond the dam, and as there is a little gangue that feeds along through the pockets and channels and also a little gangue that flows over the dam the concentrates or mineral particles after they reach the inclined sections beyond the dam need to be washed and cleaned and freed from any remaining particles of gangue (rock or sand) remaining among them. The concentrating principle of the table is not, however, confined to the inclined stepped concentrating-surfaces or to the curved or spiral or twisting construction of these inclined stepped concentrating-surfaces, as all these features can be entirely dispensed with. Thus, first, if the inclined portions of the two intersecting sections of each concentrating-surface on each side of the dam were made straight they will do good concentrating-work; second, the inclined portion from the dam to the discharge end of the table can die out into a flat smooth portion, as shown at the feed-rail side of Fig. 5, and the table will do good concentrating-work. Consequently, while we preferably make the table into inclined, stepped, intersecting, concentrating surfaces the generic principle by which the table concentrates ore in the broadest interpretation of its embodied spirit does not lie solely in the inclined concentrating-surfaces or in the inclined straight or warped or twisting sections, but lies, first, in a plurality of ore-pulp-receiving recesses or reservoirs concentrating-surfaces of any kind or shape or character of cross-section arranged parallel or substantially parallel with the longitudinal length of the table and formed at one end by the head end rail of the table and the sides of the recesses or reservoirs; second, a plurality of sections of concentrating-surfaces arranged at the discharge end of the table at a higher level than the bottom of the recess or reservoir sections and arranged at the end of each reservoir-section in such a manner as to intersect each recess or reservoir section by a ridge or bar or dam, the said dam being arranged to form of each recess or reservoir a temporary or momentary ore-pulp receiving and holding reservoir, the dam or bar of which holds in the reservoir-section a body or bed of ore-pulp against a too-rapid longitudinal feed movement of the ore-pulp from the head end of the table to its discharge end, which is caused by the reciprocating action of the table which causes the pulp to travel lengthwise from the head end rail toward the discharge end of the table. The dam by holding the ore-pulp in the reservoir gives the mineral particles time to stratify and settle to the lowest point or bottom of the reservoir-sections and to work into the ore-pockets, where they will be out of the influence of the ore-pulp that is flowing across the table; third, a pocket extending into the side of the reservoir that the ore-pulp flows away from as it flows across the reservoirs and that extends along the reservoir to or by the dam, the said pocket being arranged in such a manner that the mineral particles settle in the ore-reservoir portions and concentrate in the pocket and are conveyed by the reciprocating action of the table through the pockets to or past the dam and are deposited on the concentrates washing and classifying surfaces below the dam, where as they are moved by the reciprocating action of the table over this concentrates-washing section to the discharge end of the table they are washed with clear water and any remaining particles of gangue are separated from them and the different metals represented in the mineral particles stratify and arrange themselves side by side in the order of their specific gravities. The table portion is secured in any convenient manner to the cross-pieces 3 and sides 1 of the table-frame. The top edges of the cross-pieces may be flat and the sections of the table containing the concentrating-surfaces may be secured to them by screws, which is the construction shown in Figs. 1 and 2, or the top edges of the cross-pieces may be stepped off, as shown in Fig. 12, the steps in each cross-piece increasing in depth from the first cross-piece at the discharge end of the concentrating-surface to the last cross-piece at the head end. Then if the concentrating-surfaces are each made of a separate strip of redwood, as shown in Figs. 12 and 9, each piece can be secured to each row of steps. We preferably make the tops of the cross-piece flat and then we can use wide boards on the strip shown in Figs. 12 and 9; but when strips are used we preferably tongue and groove them, as shown in Fig. 9.

45 designates a strip of thin metal, which can be secured to the top edge of the concentrating-surfaces to prevent them wearing away as fast as they would if they were not used. These strips when used are preferably extended over the pockets in the side face of the steps, as shown.

46$^A$ designates a tailings-discharge slot in the lower side piece of the table. (See Fig. 11.) It is placed even with the top of the adjacent concentrating-surface and extends along the side far enough to allow an ample discharge-aperture for the tailings. In Fig. 1 we preferably illustrated this slot in two different sections, and a slide 47 is secured by thumb-nuts 47$^B$ to cover each slot through the side rail to the slide 47$^A$, which is provided with a slot 47$^C$, through which the thumb-nut passes. The slide enables the height of the discharge-slot to be increased or diminished, as desired. (See Figs. 11 and 1.) The discharge end of the top table does not extend to the end of its supporting-frame. An open space 48 is left between its end and the end of the frame. Across this open space and at the concentrates-discharge edge of the table a discharge-chute 49 is formed. (See Figs. 23, 1, and 5.) This chute is separated into two sections 50 and 51 by an additional chute portion, which is provided with an adjustable gate. The section 50 is a chute extending across the edge of the table and conveys the concentrates to the lower edge of the machine, from which they may be deposited in a suitable box or conveyed elsewhere. The section 51 is placed above the floor of the section 50 and at the middlings side of the table. The chute 51 consists of the floor-pieces 52 and 53, which slant downward and converge at the center, forming a V-shaped trough. The floor-piece 53 extends to the tailings side rail of the table. The floor-piece 52 extends along over the floor of section 50 a short distance and at its end an adjustable cut-out 54 is hinged at one end either by metal hinges or by a strip of leather or rubber 55. This cut-out we call a "middlings" cut-out. It is long enough to reach to about the center of the table and the discharge edge of the table and fits close against it and the outside strip 56 of the chute, so that none of the middlings can work by its edges down onto the floor of the section 50, but at the same time is loose enough to be swung up through its radius of from a position with its extreme end 57 even with the top edge of the table over to the tailings side rail, as indicated by the dotted lines 58 in Fig. 23. The middlings cut-out is used to cut out and separate from the cleanest and best portion of the concentrates which are always at the upper feed-side portion of the table as those concentrates that have some or considerable pulp mixed with them and also such portion of the pulp that works along the concentrating-surfaces that lie along the tailings side of the table.

All the concentrates and pulp that flow over the edge of the table inside of the cut-off flow into the chute 51 and through the aperture 59 into the chute 60, which conveys them to the head end of the middlings-table 46, which lies under the main table 13, where they are reconcentrated. The chute 60 is secured to the under side of the chute 50 by the strip 62 and bolt 63 or may be attached to it in any other suitable manner. The main table is supported at its opposite ends on knife-edge or spear-head bearings. These bearings comprise two vertical supporting-stands 64 and 65, one at each end of the table. The lower portion of these bearing-supports is divided into two separated legs 66 and 66$^A$, and the top portion 67 is a central vertical arm that projects up from the central portion of the legs. The legs of each support terminate with a wide spear-head or wedge-shaped end 67$^A$, that has a knife or pivotal edge that bears in a box 68, that is provided with a V-shaped recess 69, in which the pivotal knife-edge bears loosely. The boxes 68 are bolted to the floor 69$^A$, as shown in Figs. 3 and 4. The central vertical portion of the bearing-support 65 contains a spear-head or wedge-shaped terminal end 65$^A$, the knife-edge of which fits in a box 70, similar to the boxes 68, and the V-shaped recess is inverted and is preferably curved or semicircular, as shown in the cross-section in Fig. 18, which permits the table to rock or to be tilted on it. The spear-head upper ends of the supports 64 and 65 may be separated from the rest of the stand and be pivotally secured to them by a pin 70$^A$, as shown in Figs. 3 and 4. The support 64 differs from the support 65 in having an adjustable vertically-extending spear-head bearing 70$^B$, which consists of a threaded rod 71, which extends loosely through a central vertical hole formed through a hub portion 67$^\times$, formed on top of the support. The support 64 is formed at its upper end into a square-shaped open ring portion, from the center of the top portion or cross-bar of which the hub 67$^\times$ projects. On the central portion of the lower side or cross-bar of the ring portion a hub 70$^C$ is formed, through which the threaded rod 71 extends.

A hand-wheel 71$^A$ is threaded to the rod and rests on the top of the hub of the lower cross-bar. The top is provided with a spear-head or knife-edge end 70$^B$, which may be made integral with it, but is preferably separated from it and is preferably pivotally attached to it by a pin 70$^A$. (See Figs. 3 and 4.)

By turning the hand-wheel the discharge end of the table is raised and lowered, while at the same time the table may be tilted sidewise on the curved ends of the knife-edges spear-head bearings. As our table is very sensitive to any tilting movement in its action on the pulp, it is necessary that a finely-graduating mechanism for tilting it and supporting it sidewise be employed. We preferably carry out this feature of our invention in the following manner: We secure by suitable bolts to the floor or to sills 73, placed near the opposite ends of the table-brackets 74, (see Figs. 1, 2, 29, 30, 32, and 33,) which support in a bearing portion 75, a rod 76, that extends from one to the other and is mounted revolubly in each. The brackets 74 are also provided with a vertically-arranged back member 74$^A$, which is positioned at one side of the bearings 75 and against which one side of the lower end of an elastic bar of steel 78 is supported. The other side of the spring-steel bar has secured to it a short section of a toothed rack-bar 79, which meshes into a gear 80, that is revolubly mounted on a bolt 81, that has bearings in the opposite sides 82 and 83 of the bracket. (See Figs. 32 and 33.) This gear or pinion has an extending worm-gear portion 80$^A$ of slightly smaller diameter formed integral with it, and consequently mounted on the same pivotal bolt. A worm-pinion 84 is secured on the rod 76 at each bracket and meshes with the worm-gear of the bracket. The rod 76 extends through a second bearing 85, formed on the bracket that extends from and beyond the back portion, and on its end a bevel-gear 86 is secured. An arm 87 extends beyond the hub 85 from the front of the bracket and supports in a vertically-arranged hub 88, formed at its end, a vertically-extending rod 89, to the upper end of which a hand-wheel 89$^A$ is secured. A bevel-gear 90 is secured to this rod and rests on the top of the hub and meshes with the bevel-gear 86. Each upper end of the spring-steel rods 78 passes loosely through a projecting hub 91, that is bolted to the side rail 1 by means of a bolt extension and a nut 92, that extends through the side and bolts to it under the table. (See Fig. 29.) The upper ends of the spring-steel rods are preferably adjustably secured to the hubs by set-screws 93. These spring-steel bars are locked against vertical movement in their gears at their lower ends by the worm-gear and pinion, and consequently act as side supports for the upper feed side of the table; but as the table reciprocates very rapidly and as they are fixed against any but a vertical movement at their lower ends they are made of elastic spring or spring-steel, so that they will bend or spring to and fro as the table reciprocates.

By turning the hand-wheel the bevel-gears turn the rod 76 and the worm-pinion, which turns the worm-and-spur gear which raises or lowers the toothed rack and tilts the table. The worm-gear and pinion permit the slightest tilting movement to be given to the table either up or down and hold the mechanism in a set position.

The tilting device for the middlings-table is exactly like that of the main table, as shown in Figs. 29, 30, 32, 33, 2, and 3, except that an extra bracket 94 is used to support the bevel-gears 95 and 96 and the vertical hand-wheel 96$^A$ and rod 97 as they are placed at the end of the middlings-table, which necessitates an extension-rod 98 from the bracket 74$^B$, which corresponds to the rod 76 and bracket 74 of the tilting mechanism of the main table. The bracket 74$^B$ of the middlings-table in Fig. 3 is similar to the brackets 74, and the spring-steel bar 100 and the rod 97 and the worm-pinion 102 and worm-gear and spur-gear 103 at the side of the middlings-table are similar in construction to those parts of the tilting mechanism of the main table. Preferably but one spring-steel bar is used on the middlings-table.

In Fig. 2 the worm-and-gear device of both tables come in alinement and only that of the middlings-table can be seen; but in the plan Fig. 1 the separate positions of both are seen. The gears of the middlings-table are shown in that view in dotted lines. These spring-steel bars support in some degree the side weight of the table when the overbalancing-weight is on their side, and when the overbalancing-weight is on the opposite side from them there is a lifting pull on them. Consequently they are under either an upward pull or a compressing weight. The overbalancing-weight on the lifting pull is, however, light and does not in the least strain or cramp the bars. They are so resilient, however, that under this condition and when the table is rapidly reciprocated they assist to impart to it a slight resilient vibratory tremble at each stroke of the table, which very materially aids in settling and concentrating the fine mineral. The main table is rapidly reciprocated longitudinally. We carry out this feature of our invention by placing a coiled expansion-spring 104 between the center of the head or feed end of the table and a movable abutment 105. The movable abutment consists of a casting divided into two legs at its lower end, which are arranged at a distance apart and are pivotally secured by bolts 106 to the shoes 107 and 107$^A$, which are secured by bolts to a timber frame 108, which is composed of side and end timbers framed together and which forms a bed-plate for the reciprocating mechanism and which extends in two separate sills 73 and 73$^A$ under the feed-side edge of the table, along the floor, and under the tilting mechanism. If desired, these sills 73 and 73$^A$ may be dispensed with and the tilting mechanism may be bolted directly to the floor. From the two legs of the abutment a central portion extends upward centrally between them that contains in its end a circular recess, in which fits loosely one end of the expansion-spring 104. The opposite end of this spring is housed in a recessed box 112, which is bolted to the end of the frame. (See Figs. 1, 2, and 4.) From the opposite sides of the abutment just below the spring two tension-bolts 113 and 114 extend to two pedestals 115 and 116. (See Figs. 1, 2, 4, 38, 49, and 50.) The pedestals are bolted to portions of the timber bed-plate 108, that extends between the end pieces of this frame. The tension-bolts 113 and 114 extend, preferably, freely through both the pedestals and the abutment, and their abutment ends are threaded and provided with nuts 117, which bear against the outside of the abutment. The pedestals are provided with hub portions 118 below the tension-rods, in which is journaled a shaft 119, that pivotally supports a rock-arm 120. This rock-arm is shown in two different arrangements. In Figs. 55, 1, 2, and 4 it is designated 120, and in Figs. 49, 50, 38, and 39 it is designated 120$^Y$; but its action is the same in both arrangements. The preferred construction is shown in Figs. 54 and 55, in which it is a cast arm pivotally supported in the pedestal midway of its length. At its upper end the rock-arm 120 in Figs. 38, 39, 49, and 50 is formed with a head portion 121, in which a V-shaped recess 122 is formed. At its opposite end it is adjustably secured to one end of a connecting-rod 124. The upper end of the rock-arm 120 in Fig. 55 bears against a block $120^Y$, that is secured to the end of the table. A pitman 125 is provided at one end with a spear-head $125^A$ and that fits into the V-recess in the head end of the rock-lever. The opposite end of this pitman is provided with a pivotal end $125^B$, that fits loosely in a socket formed in a box 126, that is bolted to the inside of the end piece of the table-frame. The box 126 and the pitman 125 and the rock-lever are arranged in direct longitudinal alinement with the center of the spring and the table, as shown in Figs. 1, 39, and 49, and connects the table and its spring and the abutment to the reciprocating movement.

The connecting-rod 124 is pivotally connected in the form shown in Figs. 2, 34, 35, and 36 at its opposite end by a bolt 127 to an adjustable cross-head 128, that is slidably housed between the sides and back portion of a depending arm $128^A$ of a crank-lever 129. (See Figs. 31, 34, 35, 36, and 2.) This crank-lever is preferably a right-angled crank-lever positioned to stand normally with one arm $128^B$ in a horizontal plane and with its opposite arm $128^A$ in a vertical depending plane. It is pivotally mounted on a shaft 130, which passes through the angle portion between its two arms. The shaft is journaled in boxes 133 and 134, placed on each side of the crank-lever, which are bolted to the bed-plate. The cross-head is supported loosely in the housing of the crank-lever's depending arm by a threaded bolt 131, the head end of which extends through and supports the cross-head. The threaded rod extends loosely down through the horizontal arm of the crank-lever and is held in place by nuts 132 or by a hand-wheel $132^A$, which is secured to its end and by which it may be turned to raise or lower the cross-head in toward or from its center, which increases or diminishes the throw or stroke of the connecting-rod and rock-arm, and consequently of the table. The horizontal arm of the crank-lever is provided with a guide-slot $133^A$, extending into it at substantially right angles to its depending arm, that extends into its end to near its center, in which is slidably fitted a box which is preferably divided into two parts 134 and 135 and a removable adjustable portion $135^A$, (see Fig. 36,) which slips into the lower half before the two halves are united around the wrist-pin 136. The two halves of the box are provided with flanged sides that extend over the sides of the crank-arm.

$132^A$ is an oil-cup formed on the top of the arm. The removable adjustable portion of the box 134 is secured by a set-screw 137, which extends through the lower half of the boxes. The wrist-pin forms a part of a crank-shaft 138, which is revolubly journaled in bearings formed in the boxes 133 and 134. The crank-shaft extends to the outer edge of the bed-plate, where its end is supported in box 139, which is bolted to the bed-plate 108.

A tight and loose pulley 140 and 141, respectively, are mounted on the shaft between the box and a collar 142, secured on the shaft, and a fly-wheel 143 is also secured to the shaft between the pulleys and the adjacent bearings.

When power is applied to the pulleys through the medium of a belt, the shaft is rotated, and its crank wrist-pin causes the box to reciprocate in the guideway of the horizontal arm of the crank-lever, which causes the crank-arm to oscillate on its pivotal shaft and imparts a reciprocating motion to the connecting-rod.

We preferably rotate the crank-shaft in the direction of the arrow 144, (see Fig. 36,) which causes the box to approach to the nearest point to the center of the crank-arm on its up-stroke portion of its revolutions and acts to throw the horizontal arm up and the vertical arm backward about a third quicker than it is moved down by the downward stroke of its revolution, as during its downward movement it is at the farthest point of its rotary movement from the center of the crank-arm, and this slower movement operates to push on the connecting-rod and compress the spring against the abutment. While the quick motion of the reciprocal movement of the crank-arm pulls on the lower end of the rock-arm, it acts to release the spring of any back pressure and to release it quickly, causing it to expand and throw the table forward with a quick jerk that moves any pulp or mineral lying on its planes forward from the head or feed end toward the tail or discharge end. The tension of the spring is regulated by screwing up the nuts 117 of the tension-bolts, which draws the abutment toward the pedestals and rock-arm and compresses the spring between it and the end of the table. In Figs. 38 and 39, 40 and 41 we show a modification of this reciprocating movement. The rock-arm in this modification is made wider than the rock-arm in Figs. 2 and 4, 54, and 55 and comprises a yoke-shaped casting having a cross-bar 147, that unites the side portions below the top of the yoke about midway of its length. The depending sides are formed into guide-ways 148, as shown in Fig. 38 and the section Fig. 41. A cross-head $148^A$ is fitted slidably on the guideways, and a connecting-rod 124 is connected to the cross-head at one end by the nuts $124^A$ and $124^B$. A threaded rod $148^E$ is pivotally connected to the top of the cross-head and extends freely through the cross-bar 147 and is threadedly secured to and extends through a bevel-gear which rests on top of the cross-bar 147 extends loosely up through the cross-bar. A bevel-gear 150 is threaded to the rod and rests on the cross-bar, and a second bevel-gear 151 meshes in the gear 150 and is supported on the end of a horizontal rod $150^A$, that extends through a bearing $151^B$ in the adjacent side of the rock-arm and through the opening 153 in the pedestal to the side of the table, where its end is provided with a hand-wheel $150^C$ and is supported in a bracket, 154, that is secured to the bed-plate. The connecting-rod 124 is connected to the cross-head by nuts, and at its opposite end a yoke 155 is threaded to it that surrounds loosely the sides of a three-pointed cam 156, which is secured on a straight shaft 157 in the central slot 158, formed vertically through the yoke. The yoke is provided with a long slot 159 in its sides, through which the shaft extends, and is also provided with an adjustable gib 160 at one end and an engaging wall for the cam at the back. The spring 104 forces the rock-arm and connecting-rod and head back against the flat edges of the cam when its points leave the gib as it is rotated by the driving-shaft, while the points of the cam force the head forward and compress the spring when they move against the gib.

The shaft 157 is supported in boxes 161, which are bolted to the bed-plate. The vertical adjustment to change the throw of the gib in this device is in the rock-arm instead of in a crank-lever, as shown in Figs. 2, 4, 56, and 54. This modification of the reciprocal movement is shown also in Figs. 49 and 50. In Figs. 54, 55, and 56 a slight modification is also shown in the connection of the connecting-rod to the lower end of the rock-arm and also in the connection between the head of the rock-arm and the table. In this modification the head of the rock-arm $120^Y$ is made solid and abuts against a flat plate $155^A$, that forms the end of a bracket that is bolted to the end piece of the table, while the connecting-rod is pivotally connected to a sleeve $156^A$ by a bolt $157^A$ at one end that fits slidably on the lower end of the rock-arm and is adjustably secured to it by a set-screw $158^A$, which permits this end of the connecting-rod to be adjusted vertically whenever the opposite end is moved quite a distance and enables the connecting-rod to be kept in substantially a horizontal plane. The opposite end of the connecting-rod is pivotally but loosely secured in a socket formed in the cross-head $128^S$. Otherwise the reciprocating mechanism shown in Figs. 54, 55, and 56 is similar to that shown in Figs. 2 and 4. Fig. 59 also shows a slight modification. In this view the lower end of the connecting-rod $124^L$ is adjustably connected by a bolt $124^C$ to a slot $124^D$, formed in the lower end of the rock-arm, which is divided into two arms, as in Fig. 38. The opposite end is pivotally connected in a box $124^E$, that forms part of a strap $124^F$, that is held against an eccentric $124^G$, which is secured to the driving-shaft 157. Otherwise this modification is similar to that shown in Figs. 54, 55, and 56. In connection with Fig. 59 we show a vibratory bumping device. This device consists of a threaded rod $120^A$, which is threaded to a long boss $120^B$, that is secured to the bed-plate 108. At the outer end of this rod a hand-wheel $120^C$ is placed. The rod extends to in front of the lower end of the rock-arm $120^{OX}$, at which point a boss $120^D$ is formed on the rock-arm, the end of the rod and the boss being arranged to register opposite one another. On the end of the vibratory rod we secure a rubber buffer $120^E$. This rod is adjusted by turning the hand-wheel so that the rubber buffer at its end is struck violently at each reciprocation of the rock-arm by the boss at its end and imparts to the table a jar or shock which, owing to the character of the table-bearings, especially the spring-rods at its sides and the flexible make-up of the table itself, imparts to the table a vibratory tremble which is beneficial in settling the fine mineral in all ores, as it assists to throw the mineral forward, and is especially efficient in talcy ores or in ores apt to pack or stick on the table. The crank-lever and the cam are arranged to give a normal throw of about one-half of an inch to the table; but this amount of throw can be increased by the adjustable means shown to over an inch or shortened less than a quarter of an inch. On general ores a throw of one-quarter to three-quarters inch with from three hundred and twenty-five to four hundred reciprocations per minute gives the best results.

In order to make clean concentrates, it is necessary to have a sufficient supply of clean water to distribute it evenly over the table.

In Figs. 1, 2, 24, 25, 26, 27, and 28 and Figs. 49 and 50 we show three systems of water-distributing pipes, the arrangement shown in Figs. 1, 2, 24, and 25 being the preferred arrangement. In these, 162 and 163 designate vertical supporting or stand pipes, to the lower end of each of which a flange $162^A$ is threaded, which is secured to the floor alongside of the feed side CCC of the table and placed at a short distance from its ends. At their ends elbows $162^C$ are threaded and their interior passages are closed. To the elbows nipples $162^D$ and $162^E$ are threaded, and to the nipples T's 165 and $165^C$ are threaded. To the opposite end of the pipe 164 a T $165^D$ is threaded, and to the opposite end of the pipe $164^A$ a cross 168 is threaded, which is connected to the T $165^D$ by a nipple $164^B$. From the center outlets of the T's 165 and $165^C$ lateral pipes $165^A$ and $165^B$ extend over the side rail of the table, to the ends of which, preferably, three distributing-valves 166 are threaded. These valves are positioned centrally over a trough or water-distributing box 167, that is secured to the inside of the side rail and extends nearly the whole length of the table. From the top side of the cross 168 a main supply-pipe 169 extends upward, in which a controlling-valve 170 is placed, and to the lower side a depending pipe 171 is connected, in which a controlling-valve 172 is placed. From the end of this pipe a hose 173 extends and is connected by a strap 174 to the top edge of the adjacent side of the middlings-table in position to discharge into a water-distributing box 175, which is connected to the inside of the adjacent side rail.

The water-distributing boxes for both the main table and for the middlings-table are preferably made alike and are preferably made V-shaped, although they may be made square or of any other shape desired. In their bottoms discharge-apertures 176 are arranged at short intervals apart throughout their length in position to discharge the water at the top side of the table. (See Fig. 24.) If preferred, the boxes may be made to discharge through slots instead of through apertures.

In Figs. 26, 27, and 28 a slight modification of Figs. 24 and 25 is shown, which consists of, depending from each of the distributing-valves 166, a cross-pipe 166$^A$, the ends of which are closed by plugs and the lower sides of each of which along their height are perforated with small holes 176$^A$. (See Fig. 28.) When this arrangement is used, the distributing-box may be dispensed with on the top or main table. In Figs. 49 and 50 the arrangement of the clear-water-supply pipes is necessarily different, owing to the difference in the arrangement of this table and the addition of a sliming-table. In this modification the stand-pipes 177 and 178 are placed in a diagonal vertical plane across the table's frame, and along the oblique line of its discharge end they are connected by a pipe 179 and which has short branches 180 and 181 at its ends that connect with the stand-pipes 177 and 178. A valved supply-pipe 182 (see Fig. 49) connects to the stand-pipe 177 above the branch pipe 180, and from the stand-pipe a valved branch pipe 181$^A$ leads to a combined ore and water distributing box 182$^A$. A valved branch pipe 183 also extends to the water-box of the middlings-table, and there is also a valved pipe 183$^A$ leading to the water-box of the sliming-table.

In Fig. 58 we also illustrate a third modification of water-distributing pipes, in which a branch pipe runs from the main stand-pipe 184 to each of the independent step-sections of the table, where branch pipes 185, 186, and 187, and 185$^A$, 186$^A$, and 187$^A$ are run to distributing-elbows 188 and 188$^A$ and 189 and 185$^C$, 186$^C$, and 187$^C$, that discharge into the water-boxes 189$^A$ and 189$^B$.

Underneath the top or main table we place a smaller table, which we call a "middlings-table" 46, because we run over it and reconcentrate all the mineral and pulp that works to the discharge ends of the concentrating-surfaces that lie along the tailings side of the table. The product that works to the end of these lower concentrating-surfaces is a middle product between the clear mineral concentrates and the tailings and contains more or less mineral which it pays to work over or reconcentrate. This middlings-table consists of a plurality of concentrating-surfaces consisting of preferably two intersecting stepped sections of different pitches, with a dam between them, as shown in Figs. 5, 8, and 42, which, as before stated, is the preferred constructions for the main table.

The middlings-table is suspended at its feed or head end from the bottom of the main table by a bracket 12, which is bolted at its upper end to one of the cross-pieces of the table and at its lower end is pivotally bolted by a bolt 191 to the end of the middlings-table. (See Figs. 15 and 16.) A washer 190 is placed on the bolt between the table and bracket. A longitudinal brace 192 extends from this bracket to one of the cross-pieces of the table, and clamping-bolts 193 are extended through the bracket and cross-piece and tightly clamp and brace the bracket longitudinally of the table, while the transverse truss-rod 11 braces and supports it laterally. The opposite end of the middlings-table is pivotally supported by a pivotally-arranged bolt 194$^B$, to which is pivotally attached the depending end of a vertically-adjustable slidable bar 194, that is threaded to a threaded rod 194$^A$, that extends down through a bracket 195, that is bolted to the inside of the adjacent end piece 2 of the main table's frame. A hand-wheel 196 is secured to the top of the threaded rod and rests on top of the bracket. (See Figs. 21, 22, and 23, also Figs. 13 and 14, although these latter figures show a slight modification, which consists in threading the threaded rod directly to the bracket. They are, however, substantially similar.) The lower end of the bar 194 is pivotally secured to the end of the table by a bolt 194$^B$. The pivotal connection at the opposite ends of the middlings-table allows the tilting mechanism shown in Figs. 1, 2, and 3 to tilt the table up or down, while the vertical adjustment allows the discharge end to be vertically raised or lowered.

The discharge end of the middlings-table is provided with a chute 197 for leading the concentrates away from the table to one side of the machine, and a cut-out gate 197$^A$ is also provided in this chute for cutting out or separating the tailings from the concentrates. On the main table the cut-out gate is used to cut out or separate the middlings from the concentrates; but on the middlings-table it is used to separate the concentrates from the tailings. Both concentrates and tailings, however, preferably discharge over the end of the middlings-table into the chute, which is divided into two compartments or sections by the gate. This gate is hinged to the floor of the chute. The compartment between the gate and the tailings side rail of the middlings-table form a chute for the tailings, while the other compartment on the other side of the gate forms a chute for the concentrates, which feed down the upper part of the chute and drop through apertures 198 into a chute 199, which extends at one side of the chute 197, as shown by the dotted lines in Fig. 1. This chute 199 is not, however, shown in Fig. 2.

In Figs. 49 and 50 an ore separating and concentrating machine is shown that is a modification of that shown in Figs. 1, 2, 3, and 4. The top table is made with an angular-shaped cut at its discharge end. The concentrating-surfaces of the tables of this modification may be like Fig. 8, but, as shown, is like Fig. 12. This modification has a middlings-table 46 and also a sliming-table 50, placed side by side below the top table, but projecting beyond its discharge end. The concentrating-surfaces of these tables are, however, made similar to the concentrating-surfaces shown in Figs. 8 and 80. This combination of tables is adapted for the concentration of ores that go into slimes when pulverized, such as lead and zinc ores. Such ores concentrate better if crushed to pass a number four to twenty screen. There will then be from twenty-five to fifty per cent. of it that will pass from a twenty to forty screen and some of it that passes from a forty to a hundred mesh screen. The coarse will concentrate on the top table and the fine on the middlings and the slimes on the sliming table. A perspective view of this arrangement of tables is shown in Fig. 53, except that a few of the top feed-side concentrating-surfaces are curved upward at their head end and downward at their discharge end, and also the concentrating-surfaces are shown inclined at their head end toward the feed-box, which brings the intersecting ridges or dams 21 at substantially right angles to the general movement of the ore-pulp across the table. The concentrates from the feed-side riffle's concentrating-surfaces discharge into the chutes 202 and 203, (shown at the end of the table in Figs. 53 and 49 and in the perspective fragmentary view 64,) from which they may drop into a trough 203$^A$, placed under them. (See Fig. 54.) The middlings drop into the chute 204 and go to the middlings-table, dropping from the spout into the water-box 175 of the middlings-table. (See Fig. 53.) The slimes flow with the tailings and, in Figs. 49 and 53, pass, with a portion of the water, through the screens 205 into a pocket-chute 106. (See Fig. 20, which is a section through Fig. 53 on line B.) From this pocket they flow through the aperture 207 (see Fig. 20) along the spout 208, which connects at one end to this aperture and extends to the water-box 175$^A$ of the slimes-table, passing through the center brace 208$^A$ of the frame of the main table.

Only one screen is shown in Fig. 49; but three are shown in Fig. 53. These screens would also be useful when treating an ore that contained values that would go into solution when finely pulverized and mixed with water, which could be drawn off after passing the sliming-table and saved. The tailings, with the balance of the water, flow over the screens and out of the side discharge 209.

The adjustable device for raising and lowering the discharge end of the middlings and sliming tables is shown in Figs. 13 and 14, while the tilting mechanism is a modification of that used in Figs. 1 and 2, and consists of a rod 210, which passes freely through two lugs 211, which are secured to the side of the main frame. The lower end of this rod is preferably pivotally secured to a yoke-shaped lug 212, which is secured to the outside of the side of each table. (See Figs. 49, 50, and 51.) A hand-wheel 213$^c$ is threaded to the top of the threaded rod and rests on the top lug of the main table.

The mechanism for tilting the main table, similar in some of its elements to that shown in Figs. 1 and 2, is a modification in some of its other elements, these being in the actuating mechanism, which in Figs. 49 and 50 comprises a segment of a gear 214, which is secured on a shaft 213, that is revolubly mounted in a bearing 215, that forms part of a bracket 216, which is bolted to the timber bed-plate of the machine near its opposite ends. This bracket has a back portion 217, similar to the back of the bracket of Figs. 1 and 2, 29 and 30, which forms an abutment-bearing for the lower end of the spring-steel bars 78, which are the same in this view as in other figures. The gear-segment meshes into the toothed rack 79 of the spring-steel bar. A ratchet-tooth segment 218 is preferably cast integral with the bearing of one of the brackets (see Fig. 19) and extends over the top of the gear-segment, as shown in the discharge end elevation, Fig. 51, and a lever 219 is secured on the shaft alongside of the gear-segment and extends up by the ratchet-segment. This lever has a handle at its upper end and a common form of spring-controlled pawl mechanism 220, the construction of which is well understood and is illustrated in Figs. 49, 50, and 51. Both of the gear-segments are provided with a depending arm 219$^A$, and they are connected to the opposite ends of a rod 220$^A$. By raising the spring-controlled pawl and swinging the lever over the ratchet-segment the gear-segment alongside of it will raise or lower the table by lifting or lowering the spring-steel rods, and any movement of this gear-segment is transmitted to the opposite gear-segment by the rod 220$^A$, and when the pawl and lever are released the pawl will spring into the ratchet-teeth and lock the lever to the ratchet-segments in a well-known manner.

A third modification of our ore-separating-concentrating mechanism is shown in Fig. 58, which consists in making the top table into a series of several step portions 222 and 224, each step portion being located in different horizontal planes and having each a separate water-distributing box and supply-pipe system, as above explained, each branching from the main stand-pipe. This form of table is adapted to the treatment of talc or clay ore that requires a good deal of clear-water washings.

The operation of the table when reciprocated and pulp is being fed over it and the clear water from the water-supply system is also running into the water-boxes is as follows: The pulp—that is, finely-pulverized ore and water mixed to a thin flowing watery stream—flows in the device shown in Figs. 1 and 2 into feed-box, to which it is led in a spout from a stamp-mill or from other suitable wet pulverizing and sizing mills—such as Huntington mills, jigs, &c.—from which point it feeds in substantially a diagonal direction to the opposite corner of the table, as shown in Fig. 42, as the concentrating-surfaces of which our table is constructed do not contain any shoulders or abutment portions for the ore-pulp to strike against, such as is presented to ore-pulp on tables using substantially square-shouldered raised riffles or sunken riffles. The ore-pulp flows smoothly and evenly over the inclined surfaces of our table in a series of little waves caused by the flowing over the top edges of the concentrating-surfaces, up the smooth plane inclined surface of which it flows unobstructed, being impelled by the volume of the continuous-flowing pulp from the feed-box. The reservoir portion of the concentrating-surfaces quickly fills with pulp, forming a bed of ore all over the reservoir portions of the concentrating-surfaces which is constantly being washed along from one concentrating-surface to another and is replaced by the continuously-flowing pulp, which always keeps a deep bed of mineral in the reservoir portion of the concentrating-surfaces, the lower and bottom portions of which are out of reach of the active forward-flowing top portion of the pulp, while that portion of the pulp that is in the pockets is entirely out of the forward-moving pulp over the concentrating-surfaces, but is under the influence of an under-suction current that keeps the heavier particles constantly working down toward and onto the bottom of the pockets, while the very light particles of silica are forced up as the heavy particles settle down and until they get again into the top current and are carried along over the concentrating-surfaces. Under the rapid reciprocating movement of the table all the mineral that gets below the top flowing portion of the pulp is quickly sifted and settles to the surface of the upwardly-inclined concentrating-surfaces, moving down through the pulp in the direction of the little arrows 228 in Fig. 48. Those particles of mineral that are nearest to the top edge of the concentrating-surfaces are influenced by the top moving current of the pulp and are apt to be carried over into the next concentrating-surface if they get too near the top edge; but those that strike the surface from about three-quarters of the width of the concentrating-surface will as they are out of the current commence to work backward in substantially the opposite direction from the direction the pulp is flowing across the table in, as shown by the little arrows 225, and work gradually down the incline surface of the concentrating-surfaces into the pockets, their movements being increased by the under suction of the flowing pulp, which is caused by a division of the flow of the pulp in opposite directions as it flows over the top edges of the concentrating-surfaces, as indicated by the arrows 36 and $36^E$ in Fig. 48. This division is constantly carrying a portion of the pulp down into the pocket in a substantially curved line 36, that causes the pulp to roll up over against itself, as indicated by the arrows and arrests the forward action of the pulp and allows the mineral to immediately settle to the bottom of the pocket. About one-half of the depth of the pockets is entirely out of reach of any carrying forward action, and any action that it does have is simply a faint roiling action, which under the vibration of the table buoys or raises and cleans out the silica and gives the very fine mineral a chance to settle to the botttom of the pocket. A bed of pulp is thus held in the head or reservoir portion of the concentrating-surfaces between the reservoir end and the diagonal ridge or dam or bar 21, to which a constant stream of ore-pulp is added and from which a constant stream of pulp is flowing over the top edges of the concentrating-surfaces and over the intersecting ridges or dams or bars 21 at and adjacent to which point the sharp twist of the reservoir-sections of the concentrating-surfaces which taper or converge into the pockets or channels between the dam and the adjacent step (see Figs. 5 and 42) quickly guides any mineral in or on their surfaces into the pockets and guides it in its movement by the reciprocations of the table by the dams to the lower portion of the concentrating-surface, so that it will emerge from the diagonal bar, ridge, or dam 21 onto the inclined portion of the concentrates washing and classifying portion of the concentrating-surfaces at their sides nearest the feed side and clear-water side of the table, as shown in Fig. 42 by the dots 226, which indicate the mineral feeding out of the pockets or channels and past the intersecting diagonal ridge, dam, or bar between the two sections of the concentrating-surfaces onto the ore washing and classifying section below the dam of each concentrating-surface. During all the time the pulp is flowing over the table the clear water is also running from the water-supply pipes into the water-distributing box, from which it discharges through the numerous apertures in its bottom and flows in a transverse direction across the table, mingling with the pulp water and flowing in a thin clear sheet over the lesser inclined ore washing and classifying portions of the concentrating-surfaces, which at their discharge end are nearly flat concentrating-surfaces or may be, where preferred, as at the feed side of the table, substantially flat, as shown in Fig. 5, but are preferably made with the inclined warped or twisted or spiral surface. (Shown in a number of figures of the drawings.) The clear water washes from the mineral any remaining particles of silica or gangue matter. The operation of the middlings-table is the same as that of the main table.

While we have shown and described several arrangements of our concentrating-surfaces and ore-pockets, we do not wish to be limited to the form of cross-section of these two important elements of our system, as we use any character or form of ore-receiving pocket that is placed out of the path of the general direction of the main line of flow of the current of pulp over a concentrating and separating surface or placed on the opposite or oblique side of the general direction of the feed movement of a bed of pulp or mineral across a concentrating table or surface, whether rigid or flexible. To illustrate further our invention in this respect, see Figs. 60 and 61, in which the arrows 227 indicate the direction the pulp is flowing in over the table.

In Figs. 60 and 61 we illustrate the common form of riffle construction adapted to the reservoir-section of our concentrating-surface, the dams being especially arranged and adapted to prevent the concentrates of one reservoir from being carried to the next reservoir below on the table, the dams and ore-washing sections being similar to our preferred construction, and our invention contemplates any form or character of pocket in combination with any raised or projecting riffle or riffles or of any sunken recess or slot or groove passages, reservoirs, or recesses in connection with our dams, either with or without the pockets, and while we have illustrated and described the preferred construction of our intersecting inclined stepped concentrating-surfaces of different pitches for the separation and concentration of ores we do not wish to be limited to the arrangements and mechanism shown, as our invention contemplates the use of any and all methods and mechanism by which a plurality of concentrating-surfaces of any type or character or of any form or outline or design when used in combination with a bar or dam element, member, or riffle that is adapted to form a reservoir or section adapted to temporarily hold and confine in the head end portion of a concentrating-surface or in the riffles of a concentrating-surface, ore-pulp, and an ore washing and classifying section at the discharge end portion of a table.

It will be seen that the concentrating-surface of our table represents a series of intersecting concentrating-surfaces and that these concentrating-surfaces consist of flat, slightly-inclined, and steep, sharply inclined, and sloped and twisted and straight and curved concentrating-surfaces intersecting one another, as shown, first, at the outer upper end of Figs. 5 and 58, where a flat smooth table portion intersects or blends into a slightly-inclined concentrating-surface at the tail or discharge end of the tables; second, the slightly-inclined section intersecting the steep section, as at the inner end of the slightly-inclined stepped section at their diagonal dam 21 of intersection with the steep section of the head portion; third, the intersection of the straight top edge line 235 of all the concentrating-surfaces with the vertical side plane of the step 26, (see Fig. 57;) fourth, the intersection of the reservoir-section with the tapering pocket, (see Fig. 57;) fifth, the intersection of the tapering pocket with a flat portion either at the head end of the table, as at 237, or at the tail end 238, (see Fig. 57,) or as at the dying out of the tapering pocket into the slightly-inclined portion or into the flat portion of this end of the table and at the head portion where the head end of the concentrating-surface was made, as shown in either Figs. 60 or 61 before the inclined portion of the head end commences; sixth, at the line of intersection of the sections 239 and 240 in Fig. 53; seventh, as at the adaptation of our pockets and diagonal bars and concentrating-surfaces to the common form of projecting or recessed riffles in Figs. 62 and 63, in which $O'$ designates the ore-receiving recess between two tapering projecting riffles $O^2$ and $O^6$, 21 designates the diagonal bar, which is the intersecting line between the concentrating-surface $O^3$ and the tapering ore-receiving recess $O'$. At the head portion of the table this section inclines upward from the lower edge of the riffle $O^4$ to the highest point of the riffle $O^5$, so that the ore-pulp that feeds over its dam or bar 21 and up its side, as indicated by the arrow $O^7$, flows over the top edge $O^5$ onto the flat downward-tapering top of the riffle, while the ore or concentrated mineral feeds along the pockets $O^3$ and the concentrates discharge from it onto the slightly-inclined concentrates-washing section, which blends into the perfectly-flat portion at the end of the table. The pulp and water flows over the table in the direction of the arrows 35. Consequently the pockets are placed on the opposite side of the riffles from the side or wall or abutment or side of the riffles $O^9$ the pulp flows against, and the pocket is entirely out of the influence of the water and ore-pulp as it flows across the table. The action of the recessed riffles in Fig. 63 is similar for the first riffle $O^{11}$, the ore-pulp washing over the bar 21 and over the top edge $O^{12}$ onto the top of the table, and the head end of the ore-recess is straight for a short distance and then tapers up and blends out at its lowest side onto the flat top of the table; but at its opposite side at $O^{14}$ it blends up to the diagonal bar or intersecting line 21, which blends up both from the flat top portion $O^{16}$ and the lowest side $O^{15}$ to the top edge of the table at $O^{12}$. Consequently any ore-pulp that washes from the head end of the recess over this diagonal bar is washed over the flat top of the table, while the concentrated ore collects in and is forced along the pocket $O^{18}$ to its end, which blends into the top of the table at the beginning of the inclined surface. The next ore-recess is also preferably straight for a short distance from its head portion, but also tapers shallow on upward to the end of the table, and the ore-pocket preferably extends close to the end of the table, and the upper edge of the incline does not come quite up to the top of the table, as shown by the dotted line $O^{19}$. In this form the concentrates would not be washed quite as clean as in the others.

Having described our invention, what we claim as new, and desire to secure by Letters Patent, is—

1. In an ore-concentrator, a reciprocating table containing a plurality of ore-pulp-receiving recesses of predetermined length, width and depth, a plurality of ridges or dams extending across said ore-pulp-receiving recesses, a plurality of concentrates washing and classifying portions below said dams, means for feeding ore-pulp into and across said recesses, and means for flowing a supply of clear water over the concentrates below said ridges, or dams, and means for tilting and for reciprocating said table, substantially as described.

2. In an ore-concentrator, a reciprocating table containing a plurality of ore-pulp-receiving reservoirs in the head-end portion of the table of predetermined lengths, breadths and depths, a plurality of ridges or dams extending across said ore-pulp-receiving reservoirs, an independent concentrating washing and classifying portion below each of said ridges or dams, means for conveying the concentrates from each of said reservoirs to each concentrates washing and classifying portion below said ridges and dams, means for feeding ore-pulp into and over said reservoirs, means for flowing a supply of clear water over the concentrates after passing said ridges or dams, means for reciprocating said table and means for tilting said table, substantially as described.

3. In an ore concentrator and separator, a reciprocating, concentrating-table provided with a plurality of concentrating-surfaces in step form, each step comprising inclined surfaces intersecting at points intermediate of the ends of the steps.

4. In a reciprocating ore concentrator and separator a table having a concentrating-surface comprising a plurality of concentrating-surfaces in stepped form, each stepped surface comprising warped or twisted inclined surfaces intersecting each other at a point intermediate of the length of the step and each step being provided with a pocket in its vertical wall, substantially as described.

5. In an ore-concentrator, a reciprocating table comprising a plurality of separating portions in stepped relation, each separating-step comprising inclined warped surfaces intersecting each other at a point intermediate of the length of the step, the portion of the surface near the discharge end being horizontal, substantially as described.

6. In an ore-concentrator, a reciprocating concentrating-table, comprising a plurality of separating-sections in stepped relations, having their ends on which the ore or pulp first feeds inclined to form an upward slope to the direction in which the ore or pulp is moving over the table and twisting from this incline to a substantially horizontal plane at their discharge ends, substantially as described.

7. In an ore-concentrator, a reciprocating table composed of a succession of separating portions in stepped relation, each portion comprising surfaces of different pitches intersecting each other in a line diagonal to the length of the table.

8. In an ore-concentrator, a reciprocating, concentrating-table comprising a plurality of separating portions in stepped relation, each portion comprising surfaces intersecting each other on a line diagonal to the length of the table and forming a dam on said line, and a pocket extending into each wall between two separating portions and extending along the lower edge of each portion, substantially as described.

9. In an ore-concentrator, a reciprocating, concentrating-table comprising a group of independent separating portions, each portion comprising two curved inclined sections intersecting each other on a line oblique to the length of the table, the feed-section being inclined to form an uphill surface for the pulp or ore to travel over, a vertically-disposed wall between the highest edge of each portion and the lowest edge of the succeeding portion, each wall being provided with a pocket tapering toward the discharge-section and merging into the substantially horizontal surface with which the discharge-section is provided near the discharge end, substantially as described.

10. In an ore-concentrator, a reciprocating, concentrating-table comprising a plurality of independent, concentrating portions, each consisting of concentrating and discharging sections, the discharging-sections being approximately horizontal at the discharge ends, the concentrating - sections being substantially straight at the feed end, and each section being upwardly curved to form ridges intermediate of the length of the table, the concentrating portions being transversely inclined, and being arranged in step relation, a wall between each portion and tapering pockets at each corner formed by said separating portions and walls, said pockets entering the face of each wall; the ridges above mentioned extending obliquely across each portion and being adapted to retain a bed of ore or pulp in each concentrating-section and to guide the mineral of said ore into said pockets, substantially as described.

11. In a reciprocating, ore-concentrating table over which ore pulp flows, a plurality of reservoirs in the head end portion of said table adapted to receive said ore-pulp, a plurality of ridges arranged at the discharge end portion of said table and arranged to intersect said reservoir portions, a pocket or channel in each of said reservoirs arranged to receive the concentrates from said ore-pulp of said reservoirs and arranged and adapted to convey said concentrates from said reservoirs past said ridges, and means for flowing a supply of clear water over the concentrates after passing said ridges, substantially as described.

12. In an ore-concentrator, a reciprocating concentrating-table embodying on its concentrating-surface a plurality of ore-pulp-receiving recesses extending from the head end of said table toward its discharge end, a plurality of ridges adjacent to the discharge end of said table each arranged to intersect said ore-pulp-holding recesses in a diagonal line in such a manner as to form dams across them and arranged to make of said recesses, ore-pulp-holding reservoirs, and a pocket or channel in said recesses or reservoirs extending past said dam and arranged to blend into portions of said table beyond the dams formed by said ridges, substantially as described.

13. In an ore-concentrator, a reciprocating table containing a plurality of ore-pulp-receiving recesses of uniform depth for a portion of their length from the head end of the table and of decreaisng depth the rest of their length, the bottoms sloping upwardly to form diagonal ridges with the upwardly-sloping surfaces of discharge-sections which extend from said ridges to the discharge end of the table, and means for feeding pulp transversely over said series of recesses, substantially as described.

14. In an ore-concentrator, a reciprocating table containing a plurality of recesses extending longitudinally of said table, of uniform depth for a predetermined portion of their lengths, and gradually decreasing in depth by an upward slope on diagonal lines of their bottoms the rest of their length, the intersection of said upwardly-sloping bottoms with the upwardly-sloping bottoms of discharging-sections extending from said recesses to the discharge end of said table forming diagonal ridges or dams extending across said recesses, and a pocket in each channel arranged to convey the concentrates to or beyond the ridges that form said dams, substantially as described.

15. In an ore-concentrator, a reciprocating table having in its concentrating - surface a plurality of ore-pulp-receiving reservoirs extending longitudinally from the head of said table, a plurality of discharging-sections extending from the discharge end of the table to said reservoirs, the surface of said discharging-sections sloping upwardly to form diagonal intercepting dams across the ends of said reservoirs, a pocket in the side of each of said reservoirs extending beyond said dams, said reservoirs being of predetermined lengths, substantially as described.

16. In an ore-concentrator, a reciprocating table comprising a plurality of inclined intersecting surfaces forming reservoir-sections at the head of the table, extending longitudinally of said table, and discharge-sections extending from the discharge end of the table to the reservoir-sections, the surfaces of the discharge-sections being higher than those of the respective reservoir-sections, the surfaces of the reservoirs and discharge-sections being curved to different pitches to form dams at their intersections across the ends of the reservoirs, and a passage in the side of each reservoir extending by the dam to the discharging-section, each reservoir and its dam being independent in its concentrating action of those reservoirs and dams above and below it and each reservoir and its dam being of a predetermined length, substantially as described.

17. In an ore-concentrator, the combination of a reciprocating table composed of a plurality of narrow concentrating-sections, each section comprising portions inclined at different pitches, the inclined surfaces of each portion intersecting to form a diagonal ridge or dam, the portion between said ridge and the head end constituting a receptacle or reservoir for the retention of a bed of ore-pulp, a feed-box at the corner formed by the junction of the head end and the feed side, a discharge-opening through the tailing side, means for reciprocating said table and means for tilting the same, substantially as described.

18. In an ore-concentrator, the combination of a reciprocating table composed of a plurality of longitudinal concentrating-sections, each section comprising an ore-pulp-receiving portion and a concentrates washing and discharging portion, the respective portions intersecting each other to form a ridge or dam across the section at a point intermediate of its length, a channel or pocket connecting the respective portions past said ridge or dam, an ore-pulp feed-box, a water-distributing box, a tailings-outlet, and means for tilting said table, substantially as described.

19. In an ore-concentrator, the combination of a reciprocating table composed of a plurality of concentrating-sections, each section being composed of two portions, the portion at the head end of the table being so inclined as to form a deep recess, and the other portion being inclined at a less depth to form a slight step; the intersection of the two inclined portions forming a diagonal ridge, a tapering pocket extending along the side of the head portions of each section merging into the surface of the portion beyond the ridge; an ore-feed and water-distributing box at one side of said table, a tailings-discharge at the opposite side of said table, means for reciprocating said table, including a crank-lever, knife-edge bearings at each end of the table and means including a spring-rod adjustably secured to one side of said table, for adjustably securing the same, substantially as described.

20. In an ore-concentrator, the combination of a reciprocating table composed of a plurality of concentrating-sections, each section composed of a pair of warped surfaces intersecting each other intermediate of the length of the section to form a diagonal ridge or dam across the section, each section having a channel connecting the portions on each side of the ridge or dam; an inverted-V-shaped bearing-box secured to the central portion of each end of the table, a box containing a V-shaped bearing secured to a suitable foundation in vertical alinement with each of said inverted-V-shaped bearing-boxes, and knife-edge standards working in said bearing-boxes and reciprocately supporting said table, substantially as described.

21. In an ore-concentrator, a reciprocating frame provided with a surface composed of a plurality of concentrating-sections, each section comprising portions inclined at different pitches and intersecting each other, presenting upwardly-inclined, transverse and longitudinal surfaces to the passage of ore-pulp, and forming a reservoir on one side of the intersecting line, and an ore washing and classifying surface at the discharge end of the portion on the other side of the line of intersection, and a pocket or channel at the lower edge of the reservoir, extending from the head end past the line of intersection and merging into the surface beyond said line of intersection, substantially as described.

22. In an ore-concentrator, the combination of a reciprocating frame, and a table provided with a plurality of concentrating-surfaces, each provided with an inclined ore-pulp-receiving recess, an inclined portion beyond said recess substantially flat near the discharge end of the table and inclined to intersect the inclined surface of the recess on a diagonal line to form a ridge at the end of the recess, and a channel in the recess, extending past the ridge and merging into the portion beyond the same, substantially as described.

23. In an ore-concentrator, a reciprocating table having centrally at the under side of its head end a bearing-block, a vertical arm having at its upper end a spear-head terminal end pivotally journaled in said bearing-block, having the lower end of said vertical arm pivotally journaled in suitable supporting-boxes, a vertical arm at the opposite or discharge end of said table, and a threaded rod extending centrally through said vertical portion of said vertical arm, a hand-wheel threaded to said threaded rod and resting on a portion of said arm, a spear-head at the end of said threaded rod and a suitable bearing in the under side of the adjacent end of said table pivotally journaled on said spear-head, substantially as described.

24. In an ore-concentrator, the combination of a table having suitable pivotal supports, means for vertically adjusting one end of said table and means for tilting the sides of said table, with a reciprocating mechanism comprising a coiled expansive spring arranged to bear at one end against one end of said table and at its opposite end against an abutment having its lower end pivoted to a suitable supporting-base, pedestals secured to a suitable foundation-base under said table, a rock-arm pivotally secured to said pedestals, an arm secured to said table in alinement with the expansive thrust of said spring, and having a vertical plate at its end in resilient engagement with the adjacent end of said rock-arm by means of the expansive power of said spring, a connecting-rod suitably secured to the opposite end of said rock-arm at one end, and a crank-lever pivotally supported in suitable bearings intermediate of its arms, a slidable box secured in one arm of said crank-lever and pivotally attached to the opposite end of said connecting-rod, means including a threaded rod for adjusting the position of said box in the arm of said crank-lever, a sliding box in the opposite arm of said crank-lever, a crank-shaft journaled in said box and supported in suitable bearings, and means including pulleys for rotating said crank-shaft, and tension-rods adjustably secured between said pedestals and said pivotal abutment, substantially as described.

25. In an ore-concentrator, the combination with a concentrating-table of the adjustable abutment at the end of said table, the spring operatively supported between said adjustable abutment and said table, the pedestals secured under said table and the tension-rods extending between said pedestals and said adjustable abutment, with a rock-arm pivotally mounted in said pedestals, a pivotal connection between one end of said rock-arm and the end of said table adjacent to said spring, a power-driven crank-shaft mounted in suitable bearings under said table, a wrist-pin on said crank-shaft, a box pivotally mounted on the said wrist-pin of said crank-shafts and slidably mounted in one arm of said crank-lever, and means connected with the opposite arm of said crank-lever and with the lower end of said rock-arm and including a connecting-rod for adjustably varying the reciprocal stroke of said rock-arm and of said concentrating-table, substantially as described.

26. In an ore-concentrator, the combination with a concentrating-table of a variable reciprocating mechanism comprising an adjustable abutment, an oscillating, two-armed crank-lever pivotally mounted on a suitable bearing, a crank-shaft operatively journaled and connected to one arm of said crank-lever to oscillate the same and means including a rock-arm operatively connected at one end to the opposite arm of said crank-lever and at its opposite end with said table and spring for imparting an adjustable and variable reciprocative movement to said table, substantially as described.

27. In an ore-concentrating machine, the combination with the table of a bed-frame under said table, pivotal shoes secured to said bed-plate, an abutment pivotally connected at its lower end to said pivotal shoes and having its upper end free to swing toward or from one end of said table an expansive spring secured between the upper end of said abutment and the adjacent end of said table and adapted to move said table in one direction of its reciprocal movement, with the pedestals secured to said bed-plate, the adjustable tension-rods adjustably connecting said abutment to said pedestals, the rock-arm pivotally connected to said pedestal, the connecting-rod adjustably connected at one end to the lower end of said rock-arm, the two-arm crank-lever pivotally mounted on said bed-plate, the slot in one arm of said crank-arm, the box slidably mounted in the slot in said crank-arm, a crank-shaft journaled to said bed-plate having a wrist-pin pivotally journaled to said sliding box in the arm of said crank-lever, a threaded rod extending into the opposite arm of said crank-lever, means including a pivotal connection between said rod and the opposite end of said connecting-rod, substantially as described.

28. In an ore-concentrating table, a reciprocating table containing a plurality of ore-pulp-receiving passages at and adjacent to the head end, and a concentrates washing and classifying portion at and adjacent to its discharge end and having a plurality of ridges on said table positioned between said ore-pulp-receiving passages and said concentrates washing and classifying portions of said table and arranged to intersect said ore-pulp-receiving passages in such a manner as to form dams across them, means for feeding ore-pulp into and across said ore-pulp-receiving passages, means for conveying concentrates from said ore-pulp-receiving passages past said ridges or dams, means for reciprocating said table, means for flowing a supply of clear water on said concentrates after they pass said ridges or dams and means for tilting said table, substantially as described.

29. In an ore-concentrator, the combination of a reciprocating, concentrating-table vertically adjustable longitudinally above and below a horizontal plane and also vertically adjustable at its side above and below a horizontal plane and consisting of a plurality of ore-pulp-receiving recesses at the head end portion of said table, each recess having an inclined bottom which inclines at an angle upward away from the side of the table the ore-pulp is fed to the table on, and from the direction the ore-pulp flows or moves across the table in, the discharge end portion of said table being composed of a plurality of ore washing and classifying sections arranged to extend from said ore-pulp-receiving recesses to the end of said table, and arranged to intersect said ore-pulp-receiving recess in such a manner as to form ridges or dams across their discharge ends, thereby forming of said recesses ore-pulp-holding reservoirs, and having said ridges or dams arranged in any order across said table, means for conveying said concentrates from said reservoir-recesses, means for imparting a reciprocating movement to said table in a direction that will cause the concentrates to follow the angle of the dams and move from said recesses past said dams onto the ore washing and classifying portions below said dams, means for feeding ore-pulp to said recesses, and means for flowing a supply of clear water on the concentrates washing and classifying surfaces below said ridges or dams, substantially as described.

30. In an ore-concentrator, the combination of a series of longitudinal, transversely-inclined concentrating-surfaces, in two end-to-end intersecting sections of different, transversely-inclined pitches or inclinations, the upper surfaces of which are at a predetermined portion of their lengths, inclined upward from their bottoms and arranged to form a substantially central, diagonal ridge or dam across each concentrating-surface at their points of intersection, the section of each concentrating-surface between said ridge or dam and the feed end of the table being adapted by the ridge and the higher edge of the inclined, concentrating-surface to form a reservoir and detain the ore-pulp; longitudinal pockets along the lower edge of the head end sections of said concentrating-sections extending to said ridges or dams; means for feeding water to the sections of the concentrating-surfaces between the ridges or dams and the discharge end of the table, means for feeding ore-pulp to the table, and reciprocating mechanism consisting of a rock-arm, a spring and adjustable abutment, and a crank-lever coöperatively connected to said rock-arm and spring and arranged and adapted to move the ore-pulp toward the discharge end of the table, substantially as described.

31. In an ore-concentrator, the combination of a main table comprising a plurality of intersecting concentrating-surfaces, the vertical knife-edge arms at the ends of said table, one of which is adjustable, the tilting mechanism and the reciprocating mechanism, with a supplementary table comprising a plurality of intersecting concentrating-surfaces pivotally supported to the under side of said table, means for vertically adjusting one end of said supplementary table independently of said main table, means for tilting the sides of said supplementary table independent of said main table, means for feeding a predetermined portion of the ore-pulp of said main table onto said supplementary table and above the feed side of said concentrating-surfaces, and means for discharging clear water on said supplementary table at its ore-pulp-feeding side, substantially as described.

32. In an ore-concentrator the combination of a table comprising a plurality of intersecting concentrating-surfaces having a head or feed end portion and a concentrated-ore-washing portion, provided with a ridge or dam portion intersecting said head or feed end portion, means including vertical-arm bearings for vertically adjusting said table longitudinally, means including a resilient device adjustably secured to a side of said table for vertically tilting said table, and means including an expansive spring having an adjustable abutment, a rock-arm and a power-driven shaft for reciprocating said table, means for discharging ore-pulp onto said table at a point at which it will flow across the head end portion of said concentrating-surfaces, means for discharging clear water on the tail or ore-washing end portion of said concentrating-surfaces, substantially as described.

33. In an ore-concentrator, the combination of a main concentrating-table comprising a plurality of intersecting inclined concentrating-surfaces arranged in order, having a head or feed end reservoir portion and an inclined ore washing and classifying portion at its discharge end, a series of dams between said reservoir and classifying portions, means including vertical-arm bearings for vertically adjusting said table longitudinally, means including a resilient device adjustably secured to a side of said table for vertically tilting said table, and means including an expansive spring having an adjustable abutment, a rock-arm and a power-driven shaft for reciprocating said table, means for discharging ore-pulp onto said table at a point at which it will flow across the head end portion of said concentrating-surfaces, means for discharging clear water on the ore washing and classifying portions of said concentrating-surfaces and a middlings-concentrating table operatively arranged below said main table, and means for conveying the middlings of the main table to the said middlings-table, substantially as described.

34. In an ore-concentrator, the combination of the main and middlings table, the adjustable, vertical-arm, knife-edge bearing at the discharge end of said main table arranged to pivotally support said end of said table in a combined, vertically adjustable and reciprocal condition, the vertical pivotal knife-edge bearing at the opposite end of said table supporting said table in a reciprocal condition, the curved, terminal edges of the upper knife-blade edges of said vertical ends of said vertical-arm bearings, the transverse vertically-adjusting resilient supports at one side of said table comprising the spring-steel rods adjustably secured to the sides of said tables, the toothed rack, the gearing and their coöperating elements operatively connected to said spring-steel rods, reciprocating mechanism comprising the power-driven crank-shaft, the crank-lever, the rock-arm, the expansive spring, the adjustable abutment for said spring, the tension-rods and the connecting-rods between said rock-arm and said crank-lever and table, and means for discharging ore on said tables, substantially as described.

35. In an ore-concentrator, a reciprocating, concentrating-table, comprising a plurality of ore-receiving recesses at its head or feed end portion, a plurality of slightly-inclined portions at the discharge end of said table extending across the discharge ends of said ore-pulp-receiving recesses and adapted to form a dam across the ends of said ore-pulp-receiving recesses, a pocket in the lowest side edge of said ore-pulp-receiving recesses extending between said dams and the adjacent side wall of said ore-pulp-receiving recesses a predetermined distance adapted to convey the concentrates from said pockets and recesses to a predetermined point in the length of said concentrating-surface, means for reciprocating said table, means for feeding ore-pulp to and over said recesses, means for supplying water to the concentrates below said dams and means for tilting said table, substantially as described.

36. In an ore-concentrator, a reciprocating concentrating-table having a concentrating-surface formed at its head end portion comprising a plurality of stepped ore-pulp catching and holding reservoirs, a plurality of inclined, stepped concentrates washing and classifying surfaces at the discharge end portion of said table extending to said reservoir portions, a dam at the end of each of said concentrates washing and classifying portions adjacent to said reservoirs projecting above the lowest portions of said concentrates washing and classifying portions and above the lowest portions of said reservoirs and arranged and adapted to project diagonally across the discharge ends of said reservoir portions toward the head end of said table, said reservoir and dams operating to momentarily and temporarily confine the ore-pulp as it flows across the table, thereby giving the mineral particles thereon a chance to stratify and settle to the bottoms of their reservoirs, a concentrates-passage adapted to receive the concentrates from the reservoirs and to convey them a preterminied distance along the concentrating-surface, means for reciprocating said table, means for feeding ore-pulp to and across said ore-pulp-receiving reservoirs, means for flowing a supply of water to the concentrates washing and classifying surfaces below said dams and means for tilting said table, substantially as described.

37. In an ore-concentrator, the combination of a reciprocating, concentrating-table with a crank-arm pivotally journaled below said table intermediate of the ends of its arms, a slot in one arm, a box reciprocatingly mounted in the slot of said arm, a crank-shaft operatively connected to said box to oscillate said crank-lever, a box slidably secured to the opposite arm of said crank-lever, a threaded rod secured at one end to said box and supported by said crank-arm and means for turning said threaded rod to move said box to or from the pivotal center of said crank-arm, an abutment-plate on said table and means including a spring and a rock-arm coöperatively connected with said box of said crank-arm for reciprocating said table, substantially as described.

38. In a reciprocating ore-concentrator a rock-arm pivotally supported below said table, a flat abutment portion at one end of said rock-arm, an abutment-arm secured to the under side of said table having a flat abutment end in engagement with the abutment end of said rock-arm, a spring in expansive engagement with said table, an adjustable abutment at the opposite end of said spring operatively arranged relative to said rock-arm to adjust the tension of said spring and the bearing contact between the abutment-bearing of said rock-arm and the abutment-arm of said table, and means for reciprocating the opposite end of said rock-arm, substantially as described.

39. In an ore-concentrator, the combination of a reciprocating, concentrating-table, a rock-arm pivotally supported below said table, a substantially flat abutment portion at one end of said rock-arm, an abutment-arm secured to the under side of said table having a substantially flat abutment end in engagement with the abutment end of said rock-arm, a spring in expansive engagement with said table, an adjustable abutment at the opposite end of said spring operatively arranged relative to said rock-arm to adjust the tension of said spring and the bearing contact between the abutment-bearing of said rock-arm and the abutment-arm of said table, and a connecting-rod adjustably secured at one end to the opposite end of said rock-arm, with a two-armed crank-lever pivotally supported intermediate of the ends of its arms, a slot in one arm, a box reciprocatively mounted in the slot of said arm, a power-driven crank-shaft operatively connected to said box to oscillate said crank-lever, a box slidingly connected to the opposite arm of said crank-lever to move toward and from its opposite center; means for adjustably moving and for securing in an adjusted position said box relative to the pivotal center of said crank-lever and for operatively connecting said box to the opposite end of said connecting-rod, substantially as described.

40. In an ore-concentrator, the combination with a reciprocating, concentrating-table having a fixed abutment-arm, of a rock-arm pivotally secured in suitable supports below said table having one end in engagement with said abutment-arm of said table, the connecting-rod adjustably secured to said rock-arm at one end, the expansive spring arranged to bear at one end against said table, the adjustable abutment arranged to adjustably support said spring; the adjusting-rods extending from said adjustable abutment to suitable supports, the crank-lever pivotally supported intermediate of its ends and operatively connected with one arm to a power-driven shaft to be oscillated thereby, a box slidably mounted on the opposite arm of said crank-lever in engagement with the opposite end of said connecting-rod and means for adjustably moving said box toward and away from the pivotal center of said crank-lever, substantially as described.

41. In an ore concentrator and separator, a reciprocating, concentrating-table provided with a plurality of concentrating-surfaces in step form, each step composing inclined sections intersecting at points intermediate of the opposite ends of the sections of said concentrating-surfaces, and a ridge or dam portion at the point of intersection of said sections, the several dams being arranged in order across the table, substantially as described.

42. In an ore concentrator and separator, a reciprocating, concentrating-table provided with a plurality of inclined concentrating-surfaces in step form, each comprising a reservoir-section and an ore washing and classifying section, the surfaces of the reservoir and classifying sections intersecting at points intermediate of the ends of the steps, a ridge or dam portion at the point of intersection of said inclined surfaces of predetermined form, and a concentrates-passage connecting the reservoir-sections of said concentrating-surfaces with the ore washing and classifying section, substantially as described.

43. In an ore concentrator and separator, a reciprocating, concentrating-table provided with a plurality of concentrating-surfaces in step form, each stepped concentrating-surface comprising an inclined reservoir-section and an inclined ore washing and classifying section, the said sections being arranged to intersect one another at points intermediate the ends of the stepped concentrating-surfaces, a raised ridge or dam at the point of intersection, a concentrates-passage past the dam arranged to connect the lowest portions of the inclined surfaces with one another, and a pocket in the lowest side of the inclined surface at and adjacent to the head end of the table blending into said concentrates-passage, each dam being arranged in position to guide the concentrates from the reservoir-section away from the dam below it and in a substantially opposite or different direction from that in which the ore-pulp flows, the several dams being arranged in order across the table, substantially as described.

44. In an ore concentrator and separator a reciprocating, concentrating-table provided with a plurality of concentrating-surfaces in step form, each step comprising concentrating-surfaces, a dam intermediate of the opposite ends of each of said concentrating-surfaces arranged at an angle that will guide the concentrates away from the dam of the concentrating-surface below it, and a channel at the side of the dam nearest the feed side of the table arranged to connect said concentrating-surfaces on each side of the said dam, substantially as described.

45. In an ore concentrator and separator a reciprocating, concentrating-table provided with a plurality of concentrating-surfaces in step form, each step comprising inclined surfaces intersecting at points intermediate of the ends of the steps, a raised ridge or dam at the point of intersection, a pocket in the lowest side of the inclined surface at and adjacent to the head end of the table extending to opposite the ridge or dam, and having the said intersecting ridges and dams arranged in suitable, operative order across the surface of the table, and having said inclined concentrating-surfaces at the discharge end of said table arranged and adapted to wash and classify ores of different specific gravities, substantially as described.

46. In an ore concentrator and separator, a reciprocating, concentrating-table comprising a plurality of concentrating-surfaces, each concentrating-surface having an upward step or wall at one side and a downward step or wall at its opposite side, each concentrating-surface comprising an independent concentrating-surface consisting of two coöperating sections, a head end section comprising an ore-pulp-holding reservoir which extends from the head end of the table a predetermined distance toward the discharge end of the table, an inclined concentrates washing and classifying portion positioned above the bottom of said reservoir portion and extending from the discharge end of said table to said reservoir portion, a dam arranged to intersect and extend across said reservoir portion, and an upwardly-sloping inclined portion in said reservoir extending upward from its bottom adjacent to said dam to its top edge, a concentrates-passage from said reservoir past said dam, means for reciprocating said table, means for feeding ore-pulp to said table, means for flowing a supply of clear water to the concentrates washing and classifying surface below said dam, and means for tilting said table, substantially as described.

47. An ore-concentrator, comprising a concentrating-table, medium supports on which said table is pivoted so that it can tilt transversely, means for holding the table when tilted to the required position, and means for reciprocating said supports and thereby the table, substantially as described.

48. An ore-concentrator, comprising a concentrating-table, medium supports on which said table is pivoted so that it can tilt transversely, one of said supports being vertically adjustable, means for holding the table when tilted to the required position, and means for reciprocating said supports and thereby the table, substantially as described.

49. An ore-concentrator, comprising a concentrating-table, medium supports on which said table is pivoted so that it can tilt transversely, a flexible strip for holding the table when tilted to the required position, and means for reciprocating said supports and thereby the table, substantially as described.

50. In an ore-concentrator, a reciprocating table provided with a plurality of concentrating-surfaces extending a predetermined distance on a table, a dam across each concentrating-surface arranged at a predetermined part of said concentrating-surface and arranged in a diagonal line that starts at the head end and tailings side of said concentrating-surfaces and extends to the feed side and discharge end side of said concentrating-surfaces and having the series of dams arranged in order across the table, substantially as described.

51. In an ore-concentrator, a reciprocating table, comprising a plurality of operative concentrating-surfaces provided with dams arranged intermediate of the ends of said concentrating-surfaces, the said dams each commencing at predetermined distances from the head end of the table and at the tailings-discharge side of said concentrating-surfaces and extending a predetermined distance in a diagonal line toward and to the feed side of said concentrating-surfaces and having said dams arranged in any operative predetermined order across the table from the feed side of the table to its tailings-discharge side, substantially as described.

52. In an ore-concentrator a reciprocating table comprising a plurality of riffles, a plurality of dams arranged across said riffles in such a manner as to close them at predetermined points and form of them ore-pulp-holding reservoirs, said dams being positioned at a predetermined distance from the head end of said table and each commencing at the tailings-discharge side of said riffles and extending in a diagonal line toward the feed side of said riffles a predetermined distance, said dams being arranged in any desired successive order across said table from the feed side toward the tailings-discharge side, and a plurality of inclined ore-washing portions below said dams, substantially as described.

53. In an ore-concentrator a reciprocating table comprising a plurality of stepped concentrating-surfaces provided with a plurality of dams arranged intermediate of the ends of said stepped concentrating-surfaces, said dams each commencing at a predetermined distance from the head end of the table and extending in a diagonal line toward the feed side of the table a predetermined distance and having said dams arranged in any desired direction from the feed side to the tailings-discharge side of the table.

54. In an ore-concentrator, a reciprocating table comprising a plurality of concentrating-surfaces and a plurality of dams one across each concentrating-surface each of said dams extending from the head end and tailings-discharge side of said concentrating-surfaces toward the feed side and discharge end of said concentrating-surfaces and an inclined concentrates-washing surface below said dams, substantially as described.

55. In an ore-concentrator, a reciprocating table comprising a plurality of inclined stepped concentrating-surfaces extending from end to end of said table, a dam across each inclined concentrating-surface intermediate of their ends, extending at an oblique angle to each of the said inclined stepped concentrating-surfaces from one side to the other and commencing toward the head end and tailings-discharge side of each inclined stepped concentrating-surface and extending diagonally to the feed side of said inclined stepped concentrating-surfaces and having said dams arranged in series across said table from the feed side to the tailings-discharge side of the table, substantially as described.

56. In an ore concentrator and separator, a reciprocating, concentrating-table provided with a plurality of concentrating-surfaces in step form, each step comprising inclined surfaces intersecting at points intermediate of the end of the steps, the line of intersection commencing at the head end and tailings-discharge side of said concentrating-surfaces and extending diagonally toward the feed side of said inclined concentrating-surfaces the said lines of intersection being arranged in any suitable order across said table, substantially as described.

57. In a reciprocating concentrator and separator a table having a concentrating-surface comprising a plurality of concentrating-surfaces in stepped form, each stepped surface comprising inclined surfaces intersecting each other at a point intermediate of the length of the step and each step being provided with a pocket in its vertical wall, the said points of intersection being arranged to form a series of dams, each commencing toward the head end tailings-discharge side of said concentrating-surfaces and extending in a diagonal line to the feed side and discharge end of the table and to the feed side of the concentrating-surfaces, the said points of intersection being arranged in order across said table.

58. In an ore concentrator and separator a reciprocating table comprising a plurality of stepped inclined concentrating-surfaces, each concentrating-surface being composed of two end-to-end sections of differently-inclined pitches arranged to intersect each other intermediate of their ends diagonally and having the diagonal line of intersection extending from the head end and tailings-discharge side of each concentrating-surface toward the feed side of each inclined concentrating-surface and having said diagonal lines of intersection arranged in order across said table, substantially as described.

59. In an ore concentrator and separator a reciprocating table composed of a succession of separating-surfaces of equal length in stepped relation extending along the table from end to end, each concentrating-surface comprising end-to-end sections, one of which is a head and reservoir section and the other ore washing and classifying and discharge section, the said sections being of different pitches and arranged to intersect each other diagonally in such a manner that the ore-washing section forms a dam across the head end section, a passage by the feed side of each dam from one section to the other and having said intersecting dams arranged to commence at the head end and tailings-discharge side of said separating-surfaces and extend diagonally toward their feed side discharge end and having said dams arranged in a path across the table from the feed side to the discharge side of the table.

60. In an ore concentrator and separator a reciprocating table composed of a plurality of concentrating-surfaces of equal lengths extending across the table from one end to the other, each surface being composed of sections of different pitches and arranged in end-to-end order and to form diagonally-arranged ridges or dams across one another, a pocket in one wall of the ore-receiving section of each concentrating-surface, each dam being arranged from the head end and tailings side toward the feed side of each concentrating-surface and the series of dams being arranged in any suitable path across the table, substantially as described.

61. In an ore-concentrator, a reciprocating table, containing a plurality of ore-pulp-receiving reservoirs, a plurality of dams extending across the ends of said reservoirs, a plurality of ore washing and classifying portions extending from said dams to the discharge end of said table, a plurality of pockets arranged to convey concentrates from said reservoirs below said dams onto said ore washing and classifying portions, the said dams being each arranged diagonally from the head end and tailings side toward the feed side and discharge end of said table and arranged across the plurality of ore-pulp reservoirs and ore-washing sections.

62. In an ore-concentrator, a reciprocating concentrating-table, comprising a plurality of separating sections in stepped relations, having the portions of which the ore or pulp first feeds inclined to form an upward slope to the direction in which the ore or pulp is moving over the table and twisting from this incline to a substantially horizontal plane at their discharge ends, substantially as described.

63. In a reciprocating concentrator and separator, a table having a concentrating-surface comprising a plurality of concentrating-surfaces in stepped form, each stepped surface comprising warped surfaces intersecting each other at a point intermediate of the length of the step and each step being provided with a pocket in its vertical wall, the said point of intersection being arranged to form a dam commencing at the head end and tailings-discharge side of said concentrating-surfaces and extending in a diagonal line toward the feed side and discharge end of the table and toward the feed side of the concentrating-surfaces, the series of intersections being arranged across said table.

64. In an ore concentrator and separator a reciprocating, concentrating-table provided with a plurality of concentrating-surfaces in step form, each step comprising inclined surfaces intersecting at points intermediate of the ends of the steps, a raised ridge or dam at the points of intersection and connecting the lowest portions of the inclined surfaces, and a pocket in the lowest side of the inclined surface at and adjacent to the head end of the table, extending to opposite the ridge or dam, the said intersecting ridges and dams arranged in order across the surface of the table, and said inclined concentrating-surfaces at the discharge end of said table arranged and adapted to wash and classify ores of different specific gravities, substantially as described.

65. In an ore-concentrator a reciprocating table comprising a plurality of the concentrating-surfaces and a plurality of dams one across each of said concentrating-surfaces, said dams each extending from the head end and tailings-discharge side of said concentrating-surfaces toward the feed side and discharge end of said concentrating-surfaces, and an inclined concentrating washing-surface below each of said dams, substantially as described.

66. In an ore-concentrator, a reciprocating table comprising a plurality of inclined stepped concentrating-surfaces, extending from end to end of said table, a dam across each inclined concentrating-surface intermediate of its ends, extending at an oblique angle to the said inclined stepped concentrating-surface from one side to the other and from the head end and tailings-discharge side of each inclined stepped concentrating-surface diagonally toward the feed side of said surface, said dams arranged in order across said table from the feed side to the tailings-discharge side of the table, substantially as described.

67. In an ore concentrator and separator, a reciprocating concentrating-table provided with a plurality of concentrating-surfaces in step form, each step comprising inclined surfaces intersecting at a point intermediate of the end of the steps, the line of intersection of each dam commencing at the head end and tailings-discharge side of said concentrating-surfaces, and extending diagonally toward the feed side of said inclined concentrating-surfaces, the said lines of intersection being arranged in order across said table, substantially as described.

68. In a concentrator a reciprocating table having a concentrating-surface comprising two intersecting inclined stepped surfaces of different pitches intersecting each other so as to form a dam across the concentrating-surface, one section of which is formed into a reservoir by said dam and is the head end section of the concentrating-surface, the bottom of which reservoir inclines upward to the dam, the other section of which forms an inclined ore washing and classifying section that is arranged at a higher level than the reservoir-section, the said dam being arranged to direct the concentrates to the feed side of the concentrating-surface, and thus prevent the concentrates formed in the reservoir being washed too near the discharge end of the concentrating-surface, a pocket in the wall of the reservoir-section, means for reciprocating said concentrating-surface, means for tilting said concentrating-surface transversely and longitudinally, means for feeding ore-pulp to said concentrating-surface, and means for flowing a supply of clear water onto said concentrating-surface, substantially as described.

69. In a concentrator, a reciprocating table comprising two sections having inclined surfaces of different pitch, arranged end to end and intersecting each other, a dam forming the line of intersection between said surfaces, and a pocket in the wall of one of the sections, substantially as described.

In testimony whereof we affix our signatures in presence of two witnesses.

HOWARD S. BAILEY.
WILLIAM E. WILD.

Witnesses:
BESSIE THOMPSON,
CLAUDE A. DUNN.